US008618432B2

(12) United States Patent
Miller et al.

(10) Patent No.: US 8,618,432 B2
(45) Date of Patent: Dec. 31, 2013

(54) SEPARATION SYSTEM FOR RECYCLABLE MATERIAL

(75) Inventors: Steve Miller, Eugene, OR (US); Roy Miller, Eugene, OR (US)

(73) Assignee: Emerging Acquisitions, LLC, Eugene, OR (US)

(\*) Notice: Subject to any disclaimer, the term of this patent is extended or adjusted under 35 U.S.C. 154(b) by 346 days.

(21) Appl. No.: 11/959,361

(22) Filed: Dec. 18, 2007

(65) Prior Publication Data
US 2009/0152173 A1 Jun. 18, 2009

(51) Int. Cl.
*B03C 7/00* (2006.01)

(52) U.S. Cl.
USPC ............... 209/129; 209/127.2; 209/127.3

(58) Field of Classification Search
USPC ................... 209/129, 127.1, 127.2, 127.3
See application file for complete search history.

(56) References Cited

U.S. PATENT DOCUMENTS

| 530,262 | A | 12/1894 | Distl et al. |
| 785,508 | A | 3/1905 | Mason |
| 800,690 | A | 10/1905 | McDonald |
| 1,678,002 | A | 7/1928 | Duisenberg et al. |
| 1,679,593 | A | 8/1928 | Williamson et al. |
| 1,913,876 | A | 6/1933 | Frederick |
| 1,941,147 | A | 12/1933 | Johlige |
| 2,124,856 | A | 7/1938 | Kohler |
| 2,350,332 | A | 6/1944 | Albaugh, Sr. |
| 2,370,539 | A | 2/1945 | Hodecker |
| 2,417,921 | A | 3/1947 | Fox |
| 2,588,309 | A | 3/1952 | Troyer |
| 2,743,813 | A | 5/1956 | Erickson |
| 2,949,187 | A | 8/1960 | Owens |
| 3,013,662 | A \* | 12/1961 | Phillips ................. 209/129 |
| 3,062,414 | A | 11/1962 | Morris |

(Continued)

FOREIGN PATENT DOCUMENTS

| CA | 2461651 | 8/2011 |
| DE | 592126 | 1/1934 |

(Continued)

OTHER PUBLICATIONS

Nihot, Solutions in air-controlled separation, The Nihot Windshifter, Catalog.
Nihot, Sort it out with air, The Nihot Drum Separators, Catalog.
International Search Report; PCT/US2008/054621; Dated Sep. 16, 2008.

(Continued)

*Primary Examiner* — Stefanos Karmis
*Assistant Examiner* — Michael E Butler
(74) *Attorney, Agent, or Firm* — Stolowitz Ford Cowger LLP

(57) ABSTRACT

A separation system includes an air separator that, in one embodiment, primarily receives Municipal Solid Waste (MSW) containing a mixture of relatively light MSW recyclable materials such as plastic, paper, cardboard, plastic containers, and/or metal containers and relatively heavy MSW such as textiles, food waste, yard debris, etc. The air separator blows the relatively light MSW recyclable materials up though a chamber and onto a first conveyor while the other relatively heavy MSW material drops down a chute onto a second conveyor. A separation screen receives the relatively light MSW recyclable materials from the air separator and separates the relatively flat fiber and plastic film materials from the other paper, plastic and metal containers. In another separation stage, an electrostatic emitter is positioned adjacent to a conveyor for applying an electrostatic charge to the fiber and plastic materials. The electrostatic charge causes at least some of the plastic materials to at least partially cling to the conveyor belt while being carried over an end of the conveyor so that the plastic materials do not drop out as far from the conveyor as the fiber materials.

24 Claims, 16 Drawing Sheets

(56) References Cited

U.S. PATENT DOCUMENTS

| | | | |
|---|---|---|---|
| 3,104,761 A | | 9/1963 | Roberson et al. |
| 3,143,492 A | * | 8/1964 | Bullock ............... 209/127.4 |
| 3,249,225 A | | 5/1966 | Stuetzer et al. |
| 3,367,494 A | | 2/1968 | Peterson |
| 3,431,139 A | | 3/1969 | Storszynski |
| 3,477,566 A | * | 11/1969 | Autenrieth et al. ........ 209/127.1 |
| 3,477,568 A | | 11/1969 | Madrid |
| 3,545,746 A | | 12/1970 | Clayton et al. |
| 3,599,788 A | | 8/1971 | Fyfe et al. |
| 3,643,797 A | * | 2/1972 | Berkowitz et al. ............ 209/129 |
| 3,738,483 A | | 6/1973 | MacKenzie |
| 3,757,946 A | | 9/1973 | Berkowitz et al. |
| 3,788,568 A | | 1/1974 | Marsh |
| 3,831,748 A | | 8/1974 | Berkowitz et al. |
| 3,870,627 A | | 3/1975 | Herkes |
| 3,873,033 A | | 3/1975 | Tilby |
| 3,969,225 A | | 7/1976 | Horowitz |
| 4,087,177 A | | 5/1978 | Gumm et al. |
| 4,092,241 A | * | 5/1978 | Mackenzie et al. ........ 209/127.2 |
| 4,155,602 A | | 5/1979 | Quick |
| 4,202,542 A | | 5/1980 | Lammers et al. |
| 4,251,353 A | | 2/1981 | Knoll |
| 4,301,930 A | | 11/1981 | Smith |
| 4,346,524 A | * | 8/1982 | Wochnowski et al. .......... 34/482 |
| 4,352,731 A | * | 10/1982 | Moudgil et al. .................. 209/9 |
| 4,377,401 A | | 3/1983 | Laughlin |
| 4,443,332 A | | 4/1984 | de Nevers |
| 4,466,605 A | | 8/1984 | Leuthold et al. |
| 4,538,734 A | | 9/1985 | Gill |
| 4,645,063 A | * | 2/1987 | Seragnoli ...................... 198/450 |
| 4,653,648 A | | 3/1987 | Bielagus |
| 4,685,569 A | * | 8/1987 | Osaki et al. .................... 209/571 |
| 4,760,925 A | | 8/1988 | Stehle et al. |
| 4,789,068 A | | 12/1988 | Gilmore |
| 4,795,036 A | | 1/1989 | Williams |
| 4,798,508 A | | 1/1989 | Lewis |
| 4,836,388 A | | 6/1989 | Bielagus |
| 4,844,351 A | | 7/1989 | Holloway |
| 4,853,112 A | | 8/1989 | Brown |
| 4,871,073 A | | 10/1989 | Bery et al. |
| 4,892,647 A | | 1/1990 | Liddle et al. |
| 4,895,642 A | * | 1/1990 | Frei ............... 209/127.3 |
| 4,901,864 A | | 2/1990 | Daugherty |
| 4,915,824 A | | 4/1990 | Surtees |
| 4,946,046 A | | 8/1990 | Affleck et al. |
| 5,024,335 A | | 6/1991 | Lundell |
| 5,025,929 A | * | 6/1991 | Carrera ...................... 209/19 |
| 5,032,255 A | | 7/1991 | Jauncey |
| 5,051,172 A | | 9/1991 | Gilmore |
| 5,060,806 A | | 10/1991 | Savage |
| 5,074,992 A | | 12/1991 | Clinton |
| 5,163,564 A | | 11/1992 | Matula |
| 5,232,097 A | | 8/1993 | Tohkala |
| 5,344,025 A | | 9/1994 | Tyler et al. |
| 5,361,909 A | | 11/1994 | Gemmer |
| 5,361,994 A | | 11/1994 | Holloway |
| 5,450,966 A | | 9/1995 | Clark et al. |
| 5,464,981 A | | 11/1995 | Squyres et al. |
| 5,465,847 A | * | 11/1995 | Gilmore ...................... 209/12.1 |
| 5,480,034 A | | 1/1996 | Kobayashi |
| 5,484,247 A | | 1/1996 | Clark et al. |
| 5,485,925 A | | 1/1996 | Miller et al. |
| 5,506,123 A | * | 4/1996 | Chieffalo et al. ............ 439/139 |
| 5,558,234 A | | 9/1996 | Mobley |
| 5,733,592 A | | 3/1998 | Wettstein et al. |
| 5,735,402 A | | 4/1998 | Pezzoli et al. |
| 5,799,801 A | | 9/1998 | Clark et al. |
| 5,901,856 A | | 5/1999 | Brantley et al. |
| 5,913,268 A | | 6/1999 | Jackson et al. |
| 5,957,306 A | | 9/1999 | Hoffman |
| 5,960,964 A | | 10/1999 | Austin et al. |
| 5,967,333 A | | 10/1999 | Smith |
| 6,003,681 A | | 12/1999 | Wilbur et al. |
| 6,006,888 A | * | 12/1999 | Winchester ...................... 193/12 |
| RE36,537 E | | 2/2000 | Sommer, Jr. et al. |
| 6,061,924 A | | 5/2000 | Bolton et al. |
| 6,076,684 A | | 6/2000 | Bollegraaf |
| 6,077,021 A | * | 6/2000 | Roman ...................... 414/412 |
| 6,079,929 A | | 6/2000 | Muma et al. |
| 6,089,814 A | | 7/2000 | Bayer |
| 6,110,242 A | | 8/2000 | Young |
| 6,144,004 A | | 11/2000 | Doak |
| 6,149,018 A | | 11/2000 | Austin et al. |
| 6,164,455 A | | 12/2000 | Kakita et al. |
| 6,250,472 B1 | | 6/2001 | Grubbs et al. |
| 6,253,924 B1 | * | 7/2001 | Bleifuss et al. ............. 209/223.1 |
| 6,253,927 B1 | | 7/2001 | Vaananen et al. |
| 6,290,919 B1 | * | 9/2001 | Yokoyama et al. ...... 422/186.04 |
| 6,365,857 B1 | * | 4/2002 | Maehata et al. ........... 209/127.3 |
| 6,371,305 B1 | | 4/2002 | Austin et al. |
| 6,421,931 B1 | | 7/2002 | Chapman |
| 6,439,391 B1 | | 8/2002 | Seyffert |
| 6,719,119 B1 | * | 4/2004 | Hendzel et al. ........... 193/35 TE |
| 6,726,028 B2 | | 4/2004 | Visscher et al. |
| 6,851,911 B2 | * | 2/2005 | Lhoest ........................ 414/299 |
| 6,903,294 B1 | * | 6/2005 | Daiku et al. ............... 209/127.3 |
| 6,936,784 B2 | | 8/2005 | Ogburn et al. |
| 7,226,006 B2 | | 6/2007 | Porter et al. |
| 7,237,680 B2 | * | 7/2007 | Viny ............... 209/644 |
| 7,434,695 B2 | | 10/2008 | Visscher et al. |
| 7,473,407 B2 | | 1/2009 | Phillip et al. |
| 7,574,816 B2 | | 8/2009 | Shivvers |
| 7,584,856 B2 | * | 9/2009 | Miller et al. ............... 209/139.1 |
| 7,591,375 B2 | | 9/2009 | Johnson |
| 7,677,396 B2 | | 3/2010 | Visscher et al. |
| 7,677,397 B2 | | 3/2010 | Bjornson et al. |
| 7,810,646 B2 | * | 10/2010 | Miller et al. ............... 209/139.1 |
| 7,921,628 B2 | | 4/2011 | Meester |
| 7,942,273 B2 | | 5/2011 | Campbell et al. |
| 7,973,258 B2 | * | 7/2011 | Yan et al. ...................... 209/129 |
| 8,065,815 B2 | | 11/2011 | Christy et al. |
| 8,307,987 B2 | * | 11/2012 | Miller et al. ............... 209/139.1 |
| 2002/0148760 A1 | | 10/2002 | Brock et al. |
| 2003/0116486 A1 | | 6/2003 | Davis |
| 2004/0069693 A1 | | 4/2004 | Paladin |
| 2005/0092656 A1 | | 5/2005 | Yan et al. |
| 2006/0021915 A1 | | 2/2006 | Bjornson et al. |
| 2006/0122725 A1 | | 6/2006 | Duffy et al. |
| 2007/0045158 A1 | | 3/2007 | Johnson |
| 2007/0084757 A1 | * | 4/2007 | Jeon et al. ................. 209/127.1 |
| 2008/0295356 A1 | | 12/2008 | Nickerson |
| 2009/0152177 A1 | | 6/2009 | Greenspan et al. |
| 2010/0206783 A1 | | 8/2010 | Visscher et al. |
| 2010/0282647 A1 | | 11/2010 | Miller et al. |
| 2010/0288680 A1 | | 11/2010 | Campbell et al. |
| 2011/0100884 A1 | | 5/2011 | Campbell et al. |

FOREIGN PATENT DOCUMENTS

| | | |
|---|---|---|
| DE | 600232 | 6/1934 |
| DE | 609919 | 2/1935 |
| DE | 618154 | 8/1935 |
| DE | 640551 | 12/1937 |
| DE | 658699 | 3/1938 |
| DE | 1031220 | 5/1958 |
| DE | 3926451 | 3/1991 |
| DE | 4415069 | 11/1994 |
| EP | 546442 | 6/1993 |
| EP | 0546442 | 6/1993 |
| EP | 773070 | 5/1997 |
| EP | 0773070 | 5/1997 |
| FR | 2577448 | 8/1986 |
| SU | 1406093 | 6/1988 |
| WO | 2009079022 | 6/2009 |

OTHER PUBLICATIONS

Stolowitz Ford Cowger LLC, "Listing of Related Cases", Sep. 29, 2011, 1 page.
Stolowitz Ford Cowger LLP, "Listing of Related Cases", May 14, 2012, 1 page.

* cited by examiner

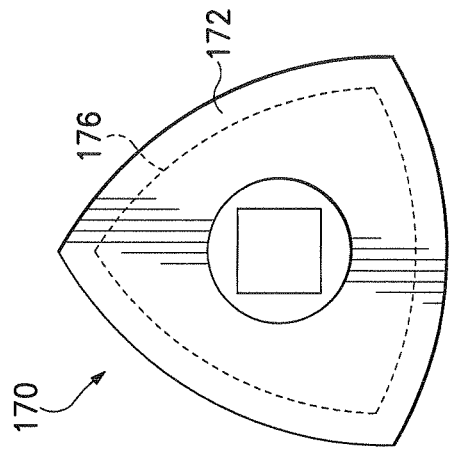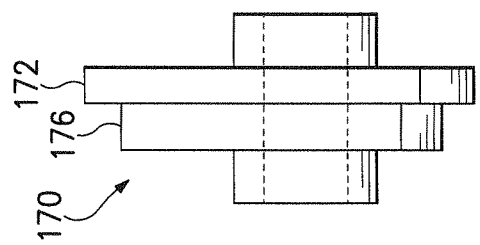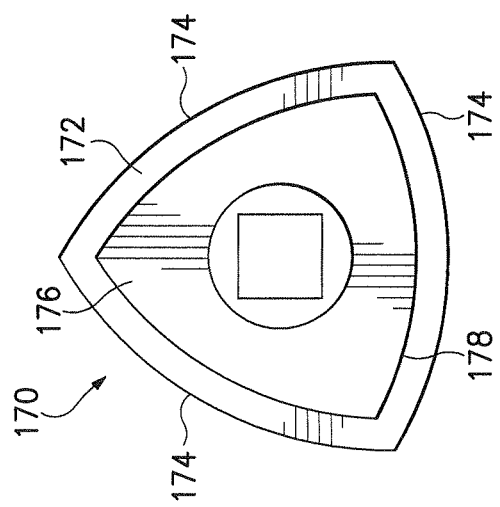

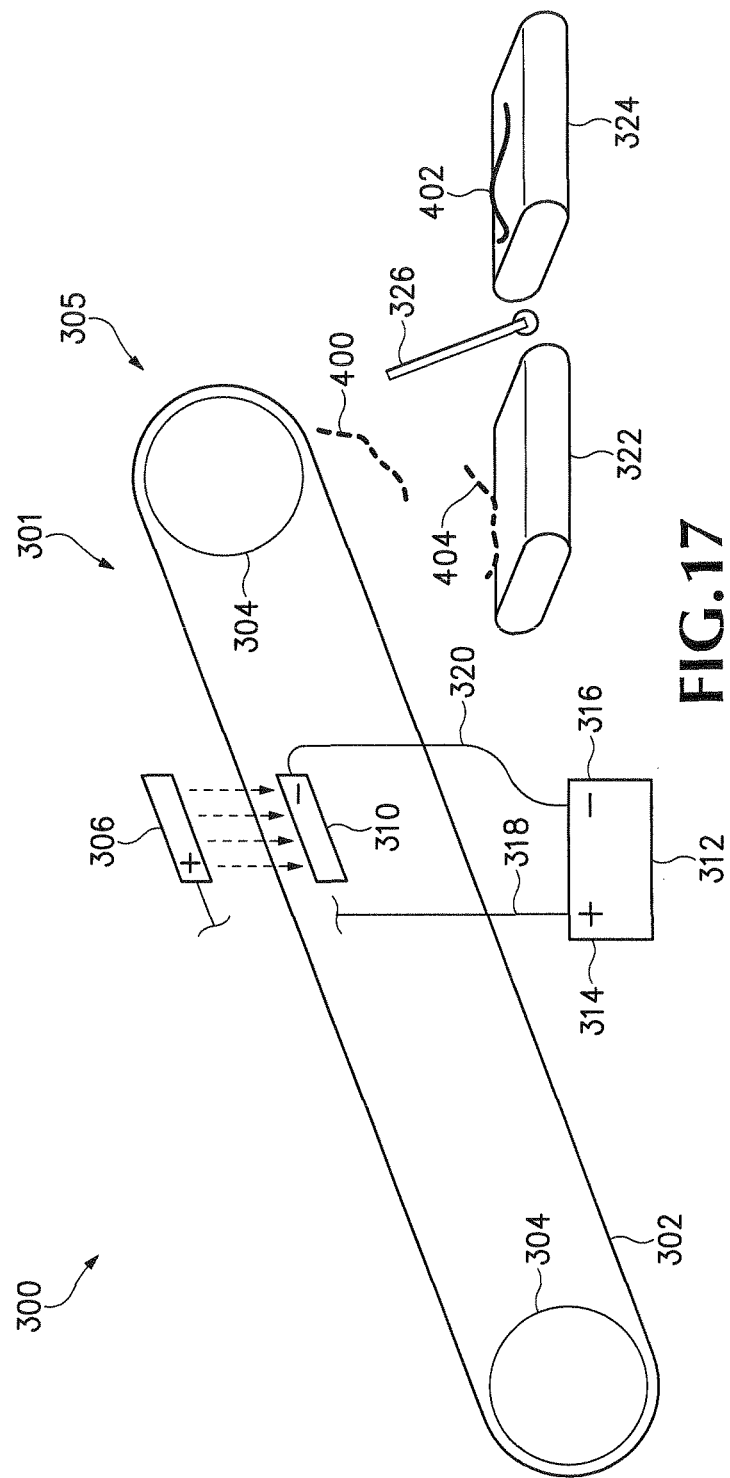

SEPARATION SYSTEM FOR RECYCLABLE MATERIAL

BACKGROUND OF THE INVENTION

1. Field of the Invention

This application relates to separating various recyclable materials from Municipal Solid Waste (MSW).

2. Description of the Related Art

It may be desirable to separate certain types of recyclable Municipal Solid Waste (MSW) from other types of recyclable or non-recyclable waste. For example, recyclable MSW materials may include plastic film, paper, Old Corrugated Cardboard (OCC); and plastic, aluminum, steel, and glass containers. These recyclable materials may need to be separated from other types of waste that may include wood, concrete, rocks, organic waste, etc. However, the recyclable MSW paper, cardboard, and containers may have sizes and/or shapes similar to other types of MSW waste. Thus, existing disc screen systems that separate materials solely according to size may not effectively separate certain MSW recyclable materials.

It also may be desirable to separate different plastic films, such as garbage bags, from fiber materials, such as paper and cardboard. However, all of these MSW materials are relatively flat, thin, and flexible. These different plastic and fiber materials are all relatively thin and light weight and have a wide variety of different widths and lengths. Even standard 8½×11 inch pieces of paper can be folded or crinkled by the time they arrive at a recycling center. Thus, it is relatively impossible to sort these different plastic and fiber materials according to size or weight.

SUMMARY OF THE INVENTION

A separation system includes an air separator that, in one embodiment, primarily receives Municipal Solid Waste (MSW) containing a mixture of relatively light MSW recyclable materials such as plastic, paper, cardboard, plastic containers, and/or metal containers and relatively heavy MSW such as textiles, food waste, yard debris, etc. The air separator blows the relatively light MSW recyclable materials up though a chamber and onto a first conveyor while the other relatively heavy MSW material drops down a chute onto a second conveyor. A separation screen receives the relatively light MSW recyclable materials from the air separator and separates the relatively flat fiber and plastic film materials from the other three dimensional paper, plastic and metal containers.

In another separation stage, an electrostatic emitter is positioned adjacent to a conveyor for applying an electrostatic charge to the flat fiber and plastic film materials. The electrostatic charge causes at least some of the plastic materials to at least partially cling to the conveyor belt while being carried over an end of the conveyor so that the plastic materials do not drop out as far from the conveyor as the fiber materials.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 6A-6C show a front view, side view and perspective view, respectively, of a compound dual-diameter disc that can be used in the separation screen shown in FIG. 2.

FIGS. 10-17 show different stages of an electrostatic separation process performed by the electrostatic separator shown in FIG. 9.

DETAILED DESCRIPTION OF THE INVENTION

Recyclable Municipal Solid Waste (MSW) materials include, but are not limited to, fiber material such as newspaper, mixed paper, Old Corrugated Cardboard (OCC), other cardboard, office paper products, plastic bags, and other plastic films. Recyclable MSW can also include relatively light plastic containers, aluminum containers, tin containers and other metal containers or shapes. The material in all of these MSW recyclable items are used for making new products that may use the same material as the recycled items. For example, the paper and cardboard fiber material is re-pulped to make new paper, cardboard, or other fiber products. The recyclable MSW PolyEthylene Terephthalate (PET), High Density PolyEthylene (HDPE), PolyVinyl Chloride (PVC), or other plastic containers and plastic films are shredded and melted into new containers or plastic bags and any other types of plastic products that may not be related to the original recovered product. For example, PET bottles can be used as fiber fill for winter jackets or as fill for mattresses. The recyclable MSW metal containers are separated out for the purpose of making new aluminum, tin, or steel products.

Figure 1:
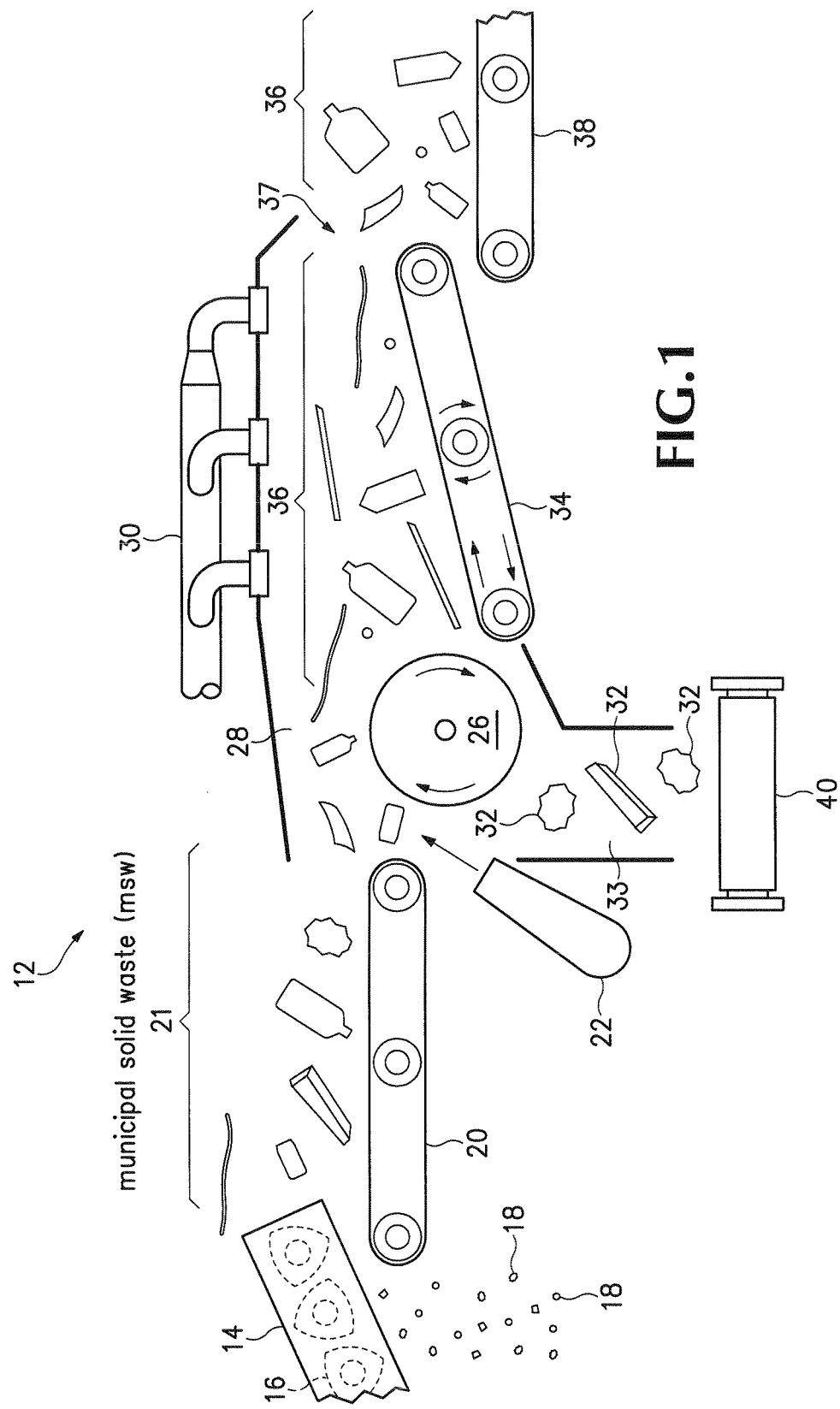
FIG. 1 is a side view of an air separator used for separating recyclable Municipal Solid Waste (MSW) materials from other MSW material.
Figure 2:
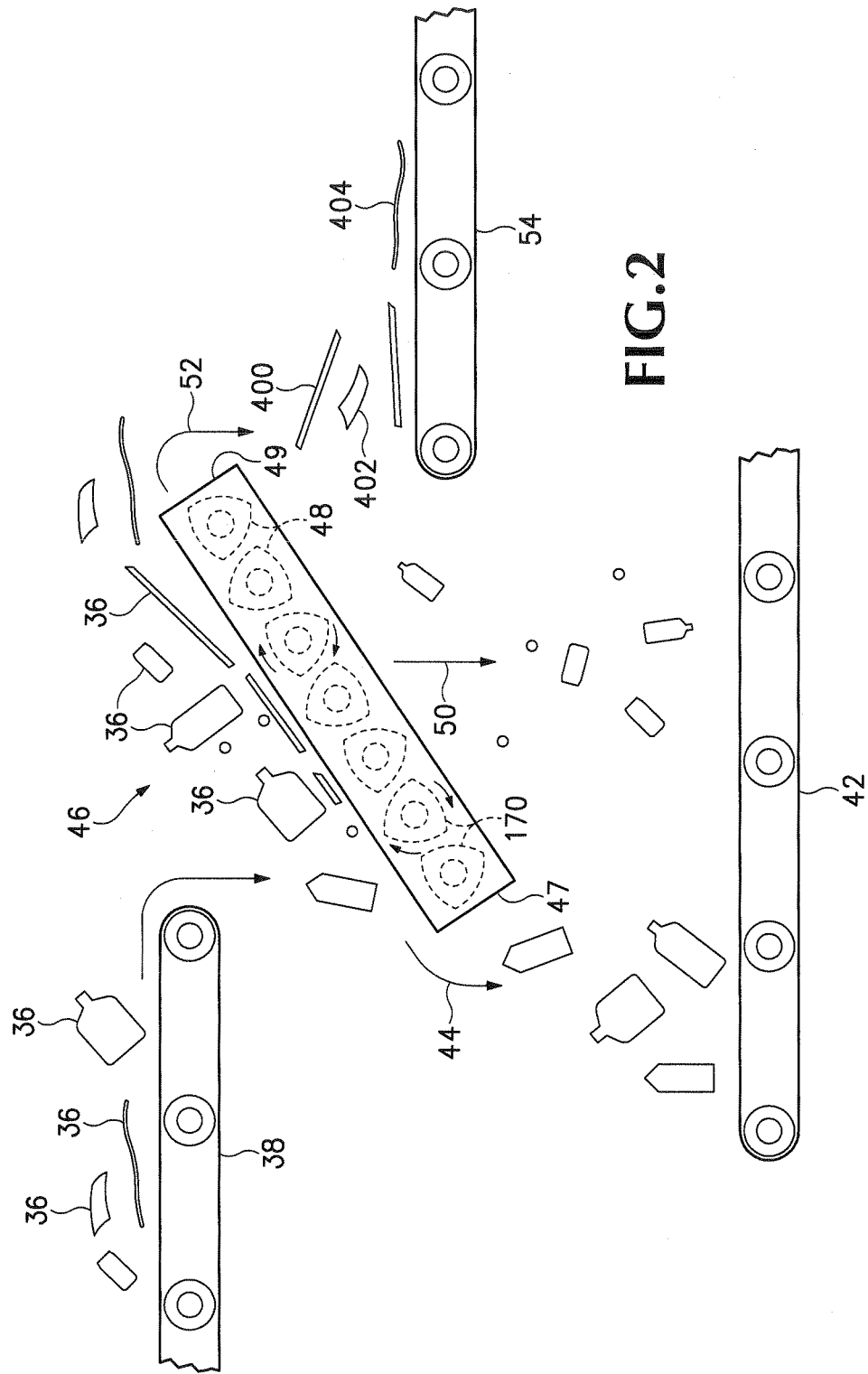
FIG. 2 is a side schematic view of a separation screen used for further separating the MSW recyclable materials output from the air separator shown in FIG. 1.

A separation system separates out the recyclable MSW materials from other MSW material and then separates the recyclable MSW fiber materials from the recyclable MSW plastic and metal containers. FIG. 1 shows an air separator 12 that separates out recyclable MSW materials 36 from other MSW material 32. FIG. 2 shows a separation screen 46 that separates the relatively flat recyclable MSW paper and cardboard fiber materials from recyclable MSW containers.

Referring first to FIG. 1, the air separator 12 includes an air chamber 28 that receives MSW 21 from a conveyor 20. In one embodiment, the MSW 21 is the waste typically retrieved from residential and office trash containers and bins. For example, the MSW 21 includes, but is not limited to; food, bottles, paper, cardboard, jars, wrappers, bags, other food containers, or any other items that may be thrown away in a home or office.

A fan 22 pulls relatively light recyclable MSW 36 over the top of a drum 26 into the air chamber 28 and onto a conveyor 34. This is accomplished by taking more air out of the air chamber 28 than is returned by the fan 22. Heavier MSW waste 32 falls down chute 33 onto a conveyor 40. In one embodiment, the drum 26 rotates to help carry the lighter recyclable MSW items 36 over drum 26 and onto conveyor 34. The recyclable MSW items 36 are carried up through air chamber 28, out opening 37, and dropped onto a conveyor 38.

The light recyclable MSW materials 36 may include newspaper, junk mail, office paper products, cardboard; plastic bottles, plastic bags, jugs, other plastic containers; and aluminum, tin, or steel cans and other metal containers.

The heavier MSW material 32 can include rocks, concrete, food waste, wood, or any other type of material that has a relatively heavier weight than the recyclable MSW materials 36. Alternatively, some of the MSW material 32 may have weights comparable with the weight of the lighter recyclable MSW items 36. However, the combination of weight and a relatively small surface area may prevent sufficient air pressure to be produced underneath some of the materials 32, preventing these materials from being blown into air chamber 28. These items also fall down through chute 33 onto conveyor 40.

There may be some recyclable items in heavy MSW 32. However, the majority of the recyclable MSW items 36 referred to above that include paper and cardboard fiber materials, plastic films, and relatively light plastic and metal containers are typically blown over drum 26 and carried by conveyor 34 through air chamber 28 and out the opening 37.

The air flow inside of chamber 28 promotes the movement and circulation of the lighter recyclable MSW items 36 over the top of drum 26 and out of the opening 37. The fan 22 can be connected to air vents 30 located on the top of chamber 28 in a substantially closed system arrangement. The fan 22 draws the air in air chamber 28 back out through air vents 30 and then re-circulates the air back into air chamber 28. A percentage of the air flow from fan 22 is diverted to an air filter (not shown). This recycling air arrangement reduces the air-pressure in air chamber 28, further promoting the circulation of light recyclable MSW materials 36 over drum 26 and out opening 37.

The negative air arrangement of the air recirculation system can also confine dust and other smaller particulates within the air chamber 28 and air vents 30. A filter (not shown) can further be inserted at the discharge of fan 22 such that a percentage of the air from the fan is diverted to a filter (not shown) to further remove some of the dust generated during the recycling process.

Current air separation systems only separate non-recyclable materials used for shredding and burning from other heavier materials. For example, air separation systems have been used for separating wood from other non-burnable materials such as concrete, rocks, and metal. MSW recyclable materials are already separated out prior to being fed into air separation systems.

Referring to FIG. 2, the light recyclable MSW items 36 are carried along conveyor 38 and dropped onto a separation screen 46. In one embodiment, the separation screen 46 includes dual-diameter discs 170 arranged to form particular openings between adjacent disc rows. The discs 170 have arched shapes that when rotated both move the items 36 up the screen 46 while at the same time vibrating the light items 36 up and down in a vertical direction. However, other types of separation screens can also be used.

The combination of gravity, the upwardly inclined angle of separation screen 46, and the shape, arrangement and rotation of discs 170, cause some of the light recyclable MSW items 44 to fall back down over a bottom end 47 of separation screen 46 onto a conveyor 42. Typically, these MSW recyclable items 44 include containers such as milk jugs, plastic bottles, beer cans, soda cans, or any other type of container having a shape and large enough size to roll backwards off the bottom end 47 of screen 46.

Other recyclable MSW items 50 drop through openings (IFO's) formed between the discs 170 while being carried up separation screen 46. The items 50 falling through the openings in separation screen 46 also fall onto conveyor 42 and typically also include plastic and metal containers. For example, the items 50 may be smaller volume containers. In one embodiment, the opening is 2"×2" but can be larger or smaller depending on the screen design.

The remaining recyclable MSW items 52 are carried over a top end 49 of separation screen 46 and dropped onto a conveyor 54. The recyclable MSW items 52 often include items with relatively flat and wide surface areas such as plastic bags, plastic films, paper, cardboard, flattened containers, and other types of fiber materials. As discussed below in FIG. 9, these waste materials may include fiber materials 404 and 400, and plastic film material 402. These relatively flat recyclable MSW items have less tendency to topple backwards over the bottom end 47 of separation screen 46 and, further, have a wide enough surface area to travel over the openings between discs 170.

Thus, the combination of the air separator 12 in FIG. 1 and the screen separator 46 in FIG. 2 first separate relatively light recyclable MSW items 36 from other MSW material 32 (FIG. 1) and then further separate the recyclable MSW plastic and metal containers 44 and 50 from the recyclable MSW plastic, paper and cardboard fiber material 52 (FIG. 2).

Referring briefly back to FIG. 1, another separation screen 14, trommel, or some other type of separation system is used for removing small items from the MSW 21. In one embodiment, the screen 14 includes discs 16 arranged to form openings of the same or various sizes that allow smaller materials 18, alternatively referred to as "fines", to drop through the screen 14. These smaller materials 18 can include small rocks, dirt, etc., that might otherwise be blown against different parts of the air separator 12 possibly damaging, or at the least, increasing the wear and tear on the air separator 12.

Figure 3:
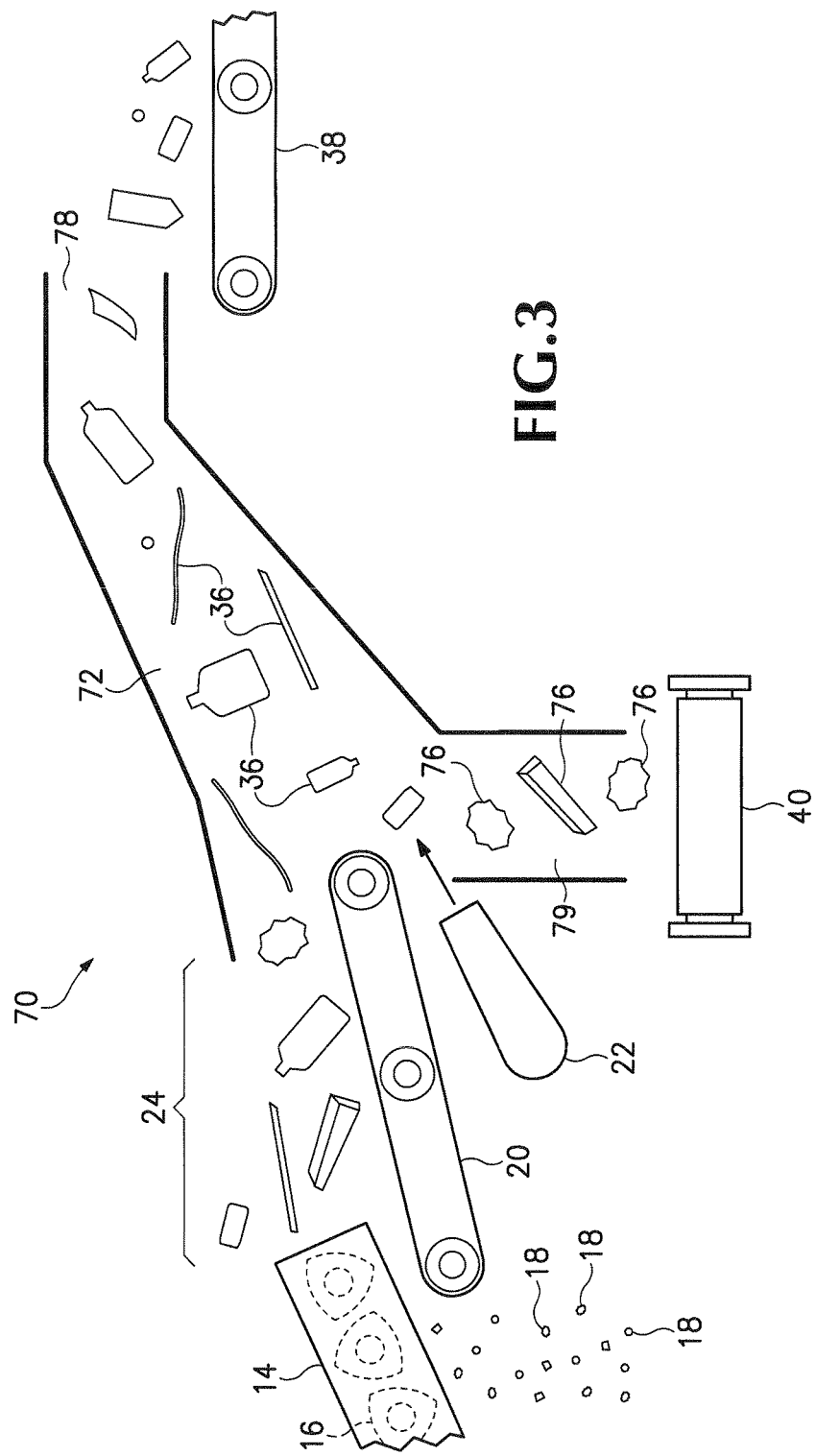
FIG. 3 is an alternative embodiment of the air separator.

FIG. 3 shows an alternative embodiment of the air separator. An air separator 70 does not use a drum and relies solely on the air pressure generated by fan 22 to pull the light recyclable MSW materials 36 through air chamber 72, out opening 78, and onto conveyor 38. The heavier MSW materials 76 fall down chute 79 onto conveyor 40.

Bag Breaker

Figure 4:
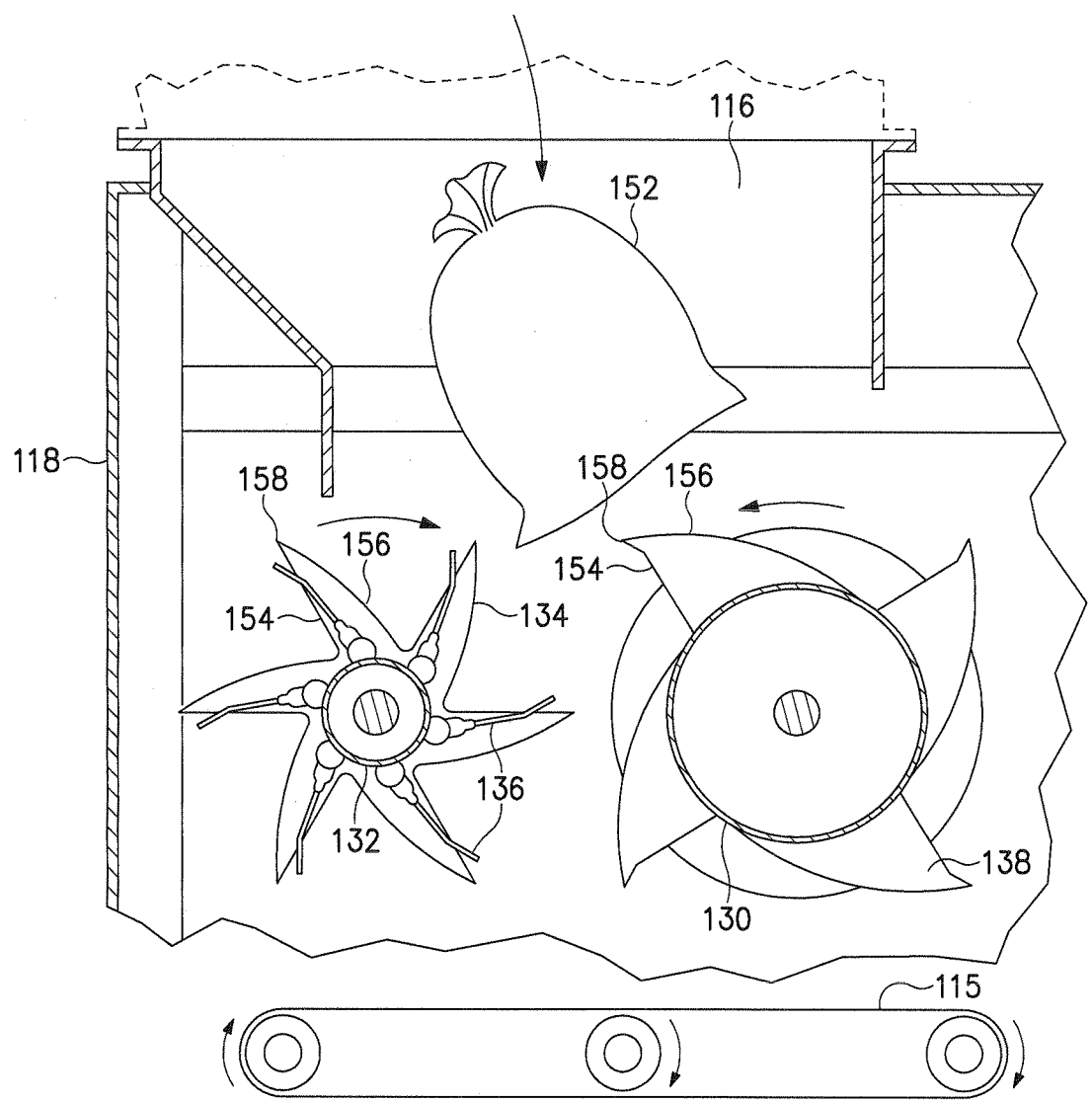
FIGS. 4 and 5 show side sectional views of a bag breaker that can be used in combination with the air separators and separation screen shown in FIGS. 1-4.

The air separation systems shown in FIGS. 1-3 can be combined with a bag breaker system shown in part in FIG. 4. The bag breaker is described in detail in U.S. Pat. No. 5,484,247, which is herein incorporated by reference.

FIG. 4 shows a partial front section view showing cylinders 132 and 130 prior to receiving a plastic bag 152. The fins 134 and 138 are spaced radially about cylinders 132 and 130, respectively. Both fins 134 and 138 each comprise a first side 154 extending substantially perpendicular from the cylinder up to a fin tip 158. A second concaved side 156 extends from a substantially tangential relationship with the cylinder up to the fin tip 158. The first and second sides of each fin 138 on cylinder 130 are shaped in substantially the same manner as the fins 134 on cylinder 132 except that the concaved side of fins 134 are sloped at a greater angle.

Each fin on cylinder 130 has a tip 158 with a radius of approximately 3/16ths inches. Each fin 134 and 138 is approximately between one inch and one and one-half inches thick. A motor rotates cylinder 132 in a clockwise direction and the same or another motor rotates cylinder 130 in an opposite counter clockwise direction.

After traveling along a conveyor (not shown), bag 152 is deposited through receiving chute 116 onto the top of fins 134 and 138. The shape, thickness and rotational speed of the fins allow the bag 152 to be ripped open as opposed to being shred open. For example, if too thin, the fins will slice bag 152 into a net and not allow all the trash in the bag to fall out. In addition, if bag 152 is shredded, little pieces of the bag will drop onto the conveyor 115 making separation of the bag 152 from the other trash difficult. Cylinder 132, in one embodiment, is rotated at between 2-10 RPMs and cylinder 30 is rotated up to six times faster than cylinder 132.

Upon falling into chute 116, bag 152 is hooked by fins 134. Fins 134 serve to slow the speed of bag 152 while descending through chute 116. The clockwise rotation of fins 134 move bag 152 to the right and downward, presenting the bag to fins 138.

The second set of fins 138 rotate in a counter clockwise direction with tip 158 angled toward bag 152. Tip 158 hooks into a second location on bag 152. The relatively blunt tip 158 on fins 138 hooks into bag 152 without slicing through the plastic material. Cylinder 130 is rotated at a substantially greater speed than cylinder 132. Thus, fins 138 pull down on bag 152 much faster than fins 134 allow a portion of bag 152 to descend. Thus, fins 138 and 134 stretch apart different locations of bag 152 until the bag 152 eventually tears open.

Figure 5:
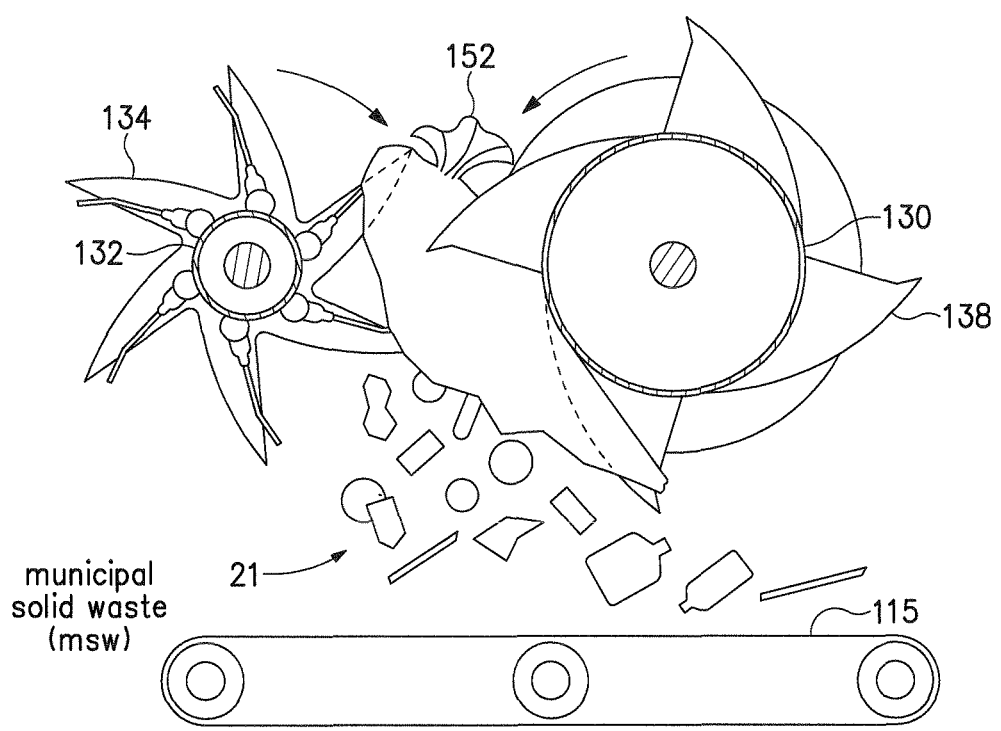

Referring to FIG. 5, fins 134 and 138 stretch the plastic bag 152 until a large tear is created that allows all the trash 21 to fall out. Cylinders 130 and 132 are spaced a sufficient distance apart so that the bottles, cans and other Municipal Solid Waste (MSW) 21 can fall between the two cylinders onto conveyor 115. Because the bag 152 is torn and not shredded, the bag often remains in substantially one piece.

The MSW 21 is carried by the conveyor 115 to the screen 14 previously shown in FIG. 1. The unique combination of the bag breaker shown in FIGS. 4 and 5 with the air separation system described above in FIGS. 1-3 allow the MSW 21 to first be automatically removed from plastic bags, then the light recyclable MSW materials separated from other MSW material, and finally the recyclable fiber material to be separated from recyclable containers.

Compound Discs

FIGS. 6A-6C show the compound disc 170 from FIG. 2 in more detail and includes a primary disc 172 having three arched sides 174. A secondary disc 176 extends from a side face of the primary disc 172 and also has three arched sides 178. The outside perimeter of the secondary disc 176 is smaller than the outside perimeter of the primary disc 172 and in one embodiment is approximately twice as wide as the width of primary disc 172. The compound disc 170 is described in U.S. Pat. No. 5,960,964, which is herein incorporated by reference.

During rotation, the arched shape of the primary disc 172 and the secondary disc 176 maintain a substantially constant spacing with similar shaped discs on adjacent shafts. However, the different relative size between the primary disc 172 and the secondary disc 176 eliminate secondary slots that normally exist between adjacent shafts. In one embodiment, the compound disc 170 is made from a unitary piece of rubber. The rubber material grips onto certain types and shapes of materials providing a more effective screening process.

Figure 7:
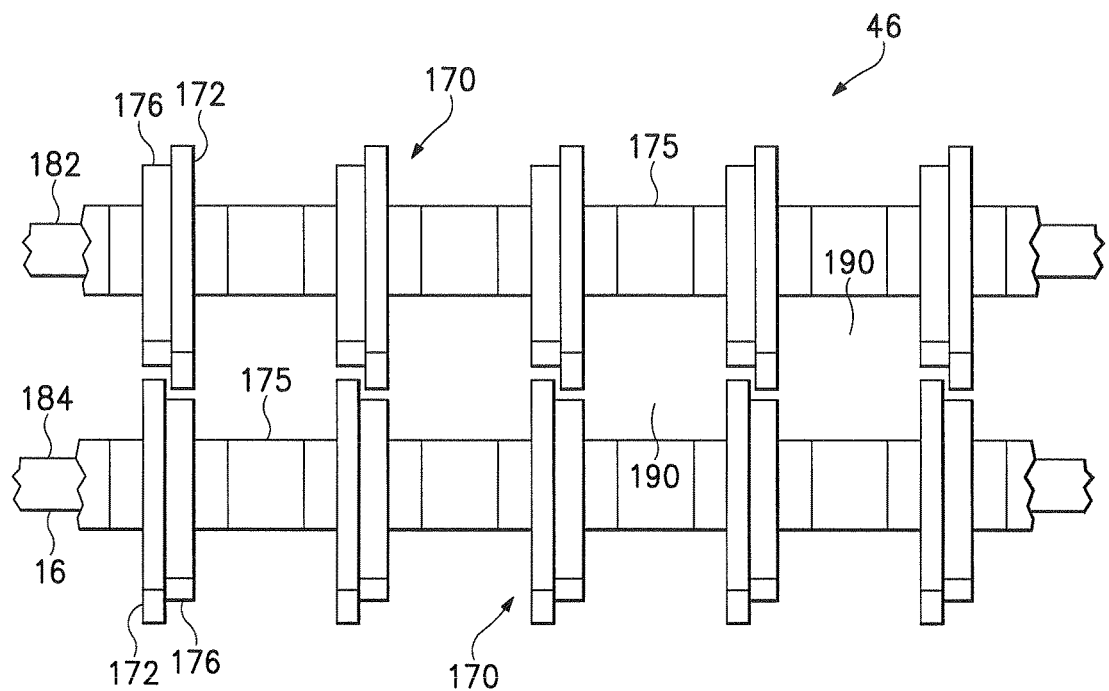
FIG. 7 is a top plan view of a separation screen section using the compound disc shown in FIGS. 6A-6C.

FIG. 7 shows a portion of the screen 46 previously shown in FIG. 2 and includes a first shaft 182 and a second shaft 184 mounted to a frame (FIG. 2) in a substantially parallel relationship. A set of primary discs 172 and associated secondary discs 176 are mounted on the first shaft 182 and separated by spacers 175. A second set of primary discs 172 are mounted on the second shaft 184 in lateral alignment on shaft 184 with secondary discs 176 on the first shaft 182. Secondary discs 176 mounted on the second shaft 184 are aligned laterally with the primary discs 172 on the first shaft 182.

The primary discs 172 on the first shaft 182 and the secondary discs 176 on the second shaft 184 maintain a substantially constant spacing during rotation. The secondary discs 176 on the first shaft 182 and the primary discs 172 on the second shaft 184 also maintain substantially constant perimeter spacing during rotation.

The alternating alignment of the primary discs 172 with the secondary discs 176 both laterally across each shaft and longitudinally between adjacent shafts eliminate the rectangular shaped secondary slots that would normally extend laterally across the entire width of the screen 46 between discs on adjacent shafts. Since large thin materials, such as paper and cardboard can no longer unintentionally pass through these secondary slots, these materials can be carried along the screen 46 and deposited in the correct location with other recyclable MSW fiber materials.

The compound discs 170 are shown as having a triangular profile with arched sides. However, the compound discs can have any number of sides, such as four sides or five sides, and any shape. In one embodiment, the primary disc 172 and the associated secondary disc 176 are formed from the same piece of rubber. However, the primary discs and associated secondary discs can also be formed from separate pieces of rubber. The primary and secondary discs may also be formed from a unitary piece of metal or from separate pieces of metal.

Figure 8:
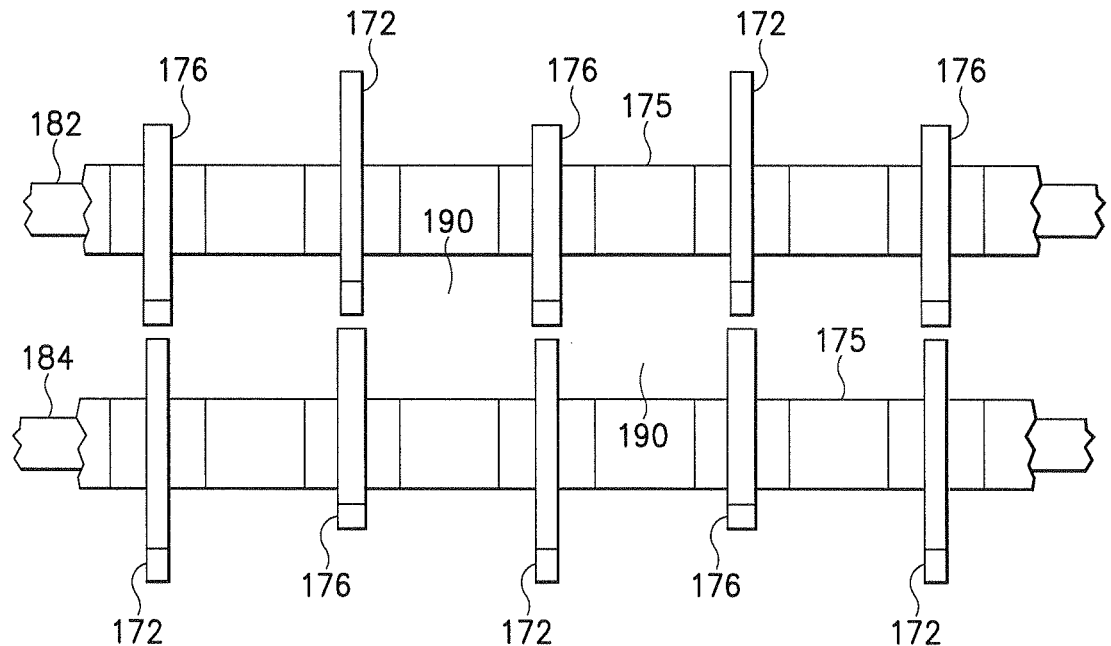
FIG. 8 is a top plan view of a separation screen section using the compound disc shown in FIGS. 6A-6C according to another embodiment.

FIG. 8 shows an alternative embodiment of the dual diameter disc. The primary discs 172 and secondary discs 176 are separate pieces formed from either rubber or metal. The primary discs 172 are mounted laterally across the shaft 182 between secondary discs 176 and separated by spacers 175. The primary discs 172 are mounted laterally across shaft 184 and aligned with secondary discs 176 on shaft 182. In turn, the secondary discs 176 on shaft 184 are aligned with primary discs 172 on shaft 182.

The different sizes and alignment of the discs on the adjacent shafts 182 and 184 create a stair-step shaped spacing laterally between the discs on the two shafts. Different spacing between the primary discs 172 and secondary discs 176, as well as the size and shapes of the primary and secondary discs, can be varied according to the types of materials being separated.

For example, the dual diameter disc system shown in FIGS. 6-8 can be used in separation screen 46 in FIG. 2. The distance between adjacent compound discs 170 in FIG. 8, or the distance between the primary and secondary discs 176 and 172 in FIG. 8, are selected in combination with the distance between shafts 182 and 184 to form openings 190. The spaces or openings 190 are sized to allow the containers 50 in FIG. 2 to drop through the screen 46 while other relatively flat and wide fiber material is carried up the screen 46 and dropped onto conveyor 54. In one embodiment, openings 190 are 2"×2" but other dimensions may also be used.

The compound discs shown in FIGS. 7 and 8 can also be used in the screen 14 shown in FIG. 1 to prescreen the MSW material prior to being fed into the air separator 12. The openings 190 for prescreen 14 in FIG. 1 is a 2" minus which has a different dimension than 2"×2". The size of openings in prescreen 14 can vary according to the market for the fines material which can differ according to region.

Electrostatic Material Separation

Figure 9:
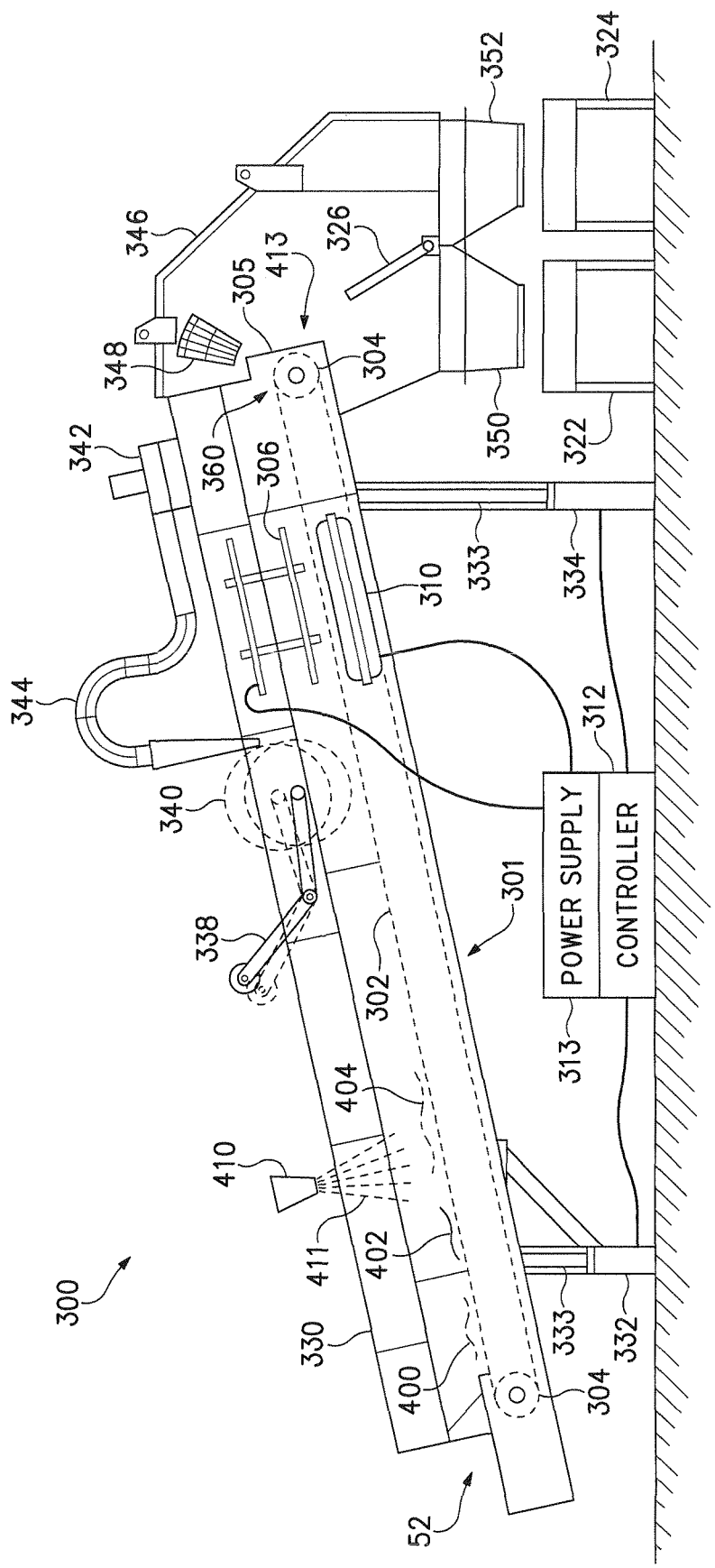
FIG. 9 is a side view of an electrostatic material separator.

In addition to the other types of material separation described above, there may also be a need to separate the plastic and fiber materials 52 described above in FIG. 2. FIG. 9 shows an electrostatic separation system 300 that separates plastic films from other fiber materials. In one example, the electrostatic separation system 300 in FIG. 9 replaces the screen or conveyor 54 shown in FIG. 2 or receives the materials 52 carried by screen or conveyor 54.

The electrostatic separation system 300 includes a conveyor 301 that receives the plastic bags, plastic film, cardboard, office paper, and any other relatively flat, thin, or other light weight waste products 52 that have been separated by the other screening processes described above in FIGS. 1-8.

FIG. 9 shows plastic film materials 400 and 404 that may include plastic trash bags, plastic packaging, or any other type of relatively flexible light weight plastic material that when electrostatically charged has a tendency to attach to conveyor belt 302. Fiber materials 402 can include paper, cardboard, or any other type fiber or metal material that has a different electrostatic charge characteristic than plastic or resin based materials. The electrostatic material separation system 300 allows whole pieces of both paper and plastic materials to be separated without any additional shredding. This is important to applications such as waste recycling where it would be too expensive and less feasible to shred every piece of plastic or fiber material. In addition, the customers of recycled fiber material may be unwilling to purchase shredded fiber out of the MSW waste stream and therefore separating the fiber material from the plastic film material.

The conveyor 301 is attached within a frame 330. A motor drives cylinders 304 that then move a conveyor belt 302 in an upwardly sloping incline within frame 330. The frame 330 is held above the ground by legs 332 and 334. The legs 332 and 334 are adjustable to vary the incline angle of conveyor 301. In one embodiment, the legs 332 and 334 include hydraulically controlled pistons 333 that can be extended or retracted for adjusting the incline angle of conveyor 301. Of course, any other type of extendable leg mechanism could also be used.

The conveyor 301 moves both the fiber material 402 and the plastic materials 400 and 404 underneath an electrostatic emitter/ion emitter 306 that applies an electrostatic charge. The electrostatic charge causes at least some of the plastic materials 400 and 404 to at least partially cling to the conveyor belt 302 while being carried over a back end 305 of the conveyor 301.

The electrostatic cling holds the plastic materials 400 and 404 to the conveyor belt 302 while the fiber material 402 is launched out over the end 305 of conveyor 301. This creates a projection differential where the plastic materials 400 and 404 are dropped or pulled down relatively close to the end 305 of the conveyor 301. The fiber materials 402 are projected significantly farther out from the back end 305. This projection differential is used to separate the plastic materials 400 and 404 from the fiber materials 402.

Any number of electrostatic emitters/ion emitters can be used and can be located at one or more different locations adjacent to the conveyor 301. The number and location of the electrostatic emitters can vary depending on the amount of electrostatic charge desired to be applied to the waste material 400-404. In the example in FIG. 9, a first electrostatic emitter or collector 306 is located above the conveyor 301 and has a first charge polarity and a second electrostatic emitter or collector 310 is located underneath the conveyor 301 and has a second opposite charge polarity. For example, the electrostatic emitter 306 may be connected to a positive voltage and the second electrostatic collector 310 may be connected to a negative voltage. This positive/negative ion emitter/collector configuration increases the amount of electrostatic charge applied to the waste materials 400-404.

A third electrostatic emitter 348 can be located at the back end 305 of the conveyor 301 at location 360 where the fiber and plastic materials 400-404 start to fall over the conveyor 301. The third electrostatic emitter 348 in this example includes five separate electrostatic emitters that are arranged in a partial arch that extends in parallel about the rounded back end 305 of the conveyor 301.

A controller 312 includes a power supply 313 that can vary the voltage across the two electrostatic elements 306 and 310 to any value. In one example, the power supply 313 is selectable to any voltage between 0 and 50,000 volts and may vary according to the speed of conveyor belt 302, and the number and location of electrostatic elements 306, 310, and 348.

In other embodiments, the voltage polarities may be varied so that one or more of the different electrostatic elements 306, 310, and/or 348 is attached to a positive voltage while the remaining electrostatic elements 306, 310, and 348 are attached to a negative voltage. In another embodiment, all of the electrostatic elements 306, 310, and 348 are attached to either a same positive or negative voltage while an opposite voltage is coupled to ground.

A first chute 350 is located below the back end of the conveyor 301 for receiving the plastic film 400 and 404 and a second chute 352 is located farther away from the back end of the conveyor 301 for receiving the fiber materials 402 that project farther out from the conveyor 301. A separator arm 326 can be rotated clockwise or counter clockwise according to what distances the different materials are dropped off or projected out from the conveyor 301. A first conveyor 322 receives the separated plastic material 400 and 404 and a second conveyor 324 receives the separated fiber material 402.

A hold down drum 340 is located above the conveyor 301 and used for flattening and spreading out the fiber and plastic material 400-404. A rotatable arm 338 can rotate upward allowing the hold down drum 340 to roll over waste materials of different sizes and shapes. The weight of the spreader drum 340 flattens out the waste materials 400-404 increasing the ability of the plastic materials 400 and 404 to electrostatically cling to the conveyor belt 302.

The hold down drum 340 helps to spread the different plastic film and fiber materials 400-404 over conveyor 301 so that the waste materials lie relatively flat on the conveyor belt 302. Flattening out the waste materials also prevents the waste materials 400-404 from catching on the electrostatic emitter 306.

An air stripper 344 is positioned in back of the hold down drum 340 and is used for blowing the fiber and plastic material 400-404 off of the hold down drum 340. The air stripper 344 also moves different types of materials off of each other. For example, the air blower 344 may separate two pieces of the waste materials 400-404 that are currently on top of each other allowing the two separated waste materials to be separately charged.

An optional water sprayer 410 may be located above the conveyor 301 and apply a fine mist of water 411 to the waste materials 400-404. Applying water 411 to the waste materials can promote the retention of an electrostatic charge and thereby increase the electrostatic cling of the plastic material 400 and 404 to the conveyor belt 302.

Different materials can be used for conveyor belt 302 that promote additional electrostatic cling of the plastic film. For example, it has been discovered that a rubber conveyor belt 302 has good electrostatic cling characteristics. Thus, in one embodiment, the conveyor belt 302 is made of a rubber material that is then negatively charged by the second electrostatic emitter 310 to further promote electrostatic cling with the plastic materials 400 and 404. In another embodiment, a fabric conveyor belt 301 is used that also provides an acceptable static cling with electrostatically charged plastic film. Of course, any other material that can electrostatically cling to a plastic film can also be used.

An operator can use controller 312 to vary the speed of the conveyor motor 413 and accordingly the speed that materials are carried on conveyor belt 302 and projected from the end 305 of conveyor 301. Controller 312 can also be used to adjust the incline angle of conveyor 301 by controlling the height of legs 332 and 334. An operator can also use controller 312 to vary the amount of electrostatic charge applied to waste materials 400-404 by changing the amount voltage from power supply 313 supplied to the electrostatic emitters 306, 310, and 348. The speed and incline angle of conveyor 301, and the amount of electrostatic charge applied by the electrostatic emitters can all be varied by controller 312 until an optimal separation is provided between the plastic films 400 and 404 and the fiber material 402.

Figure 10:
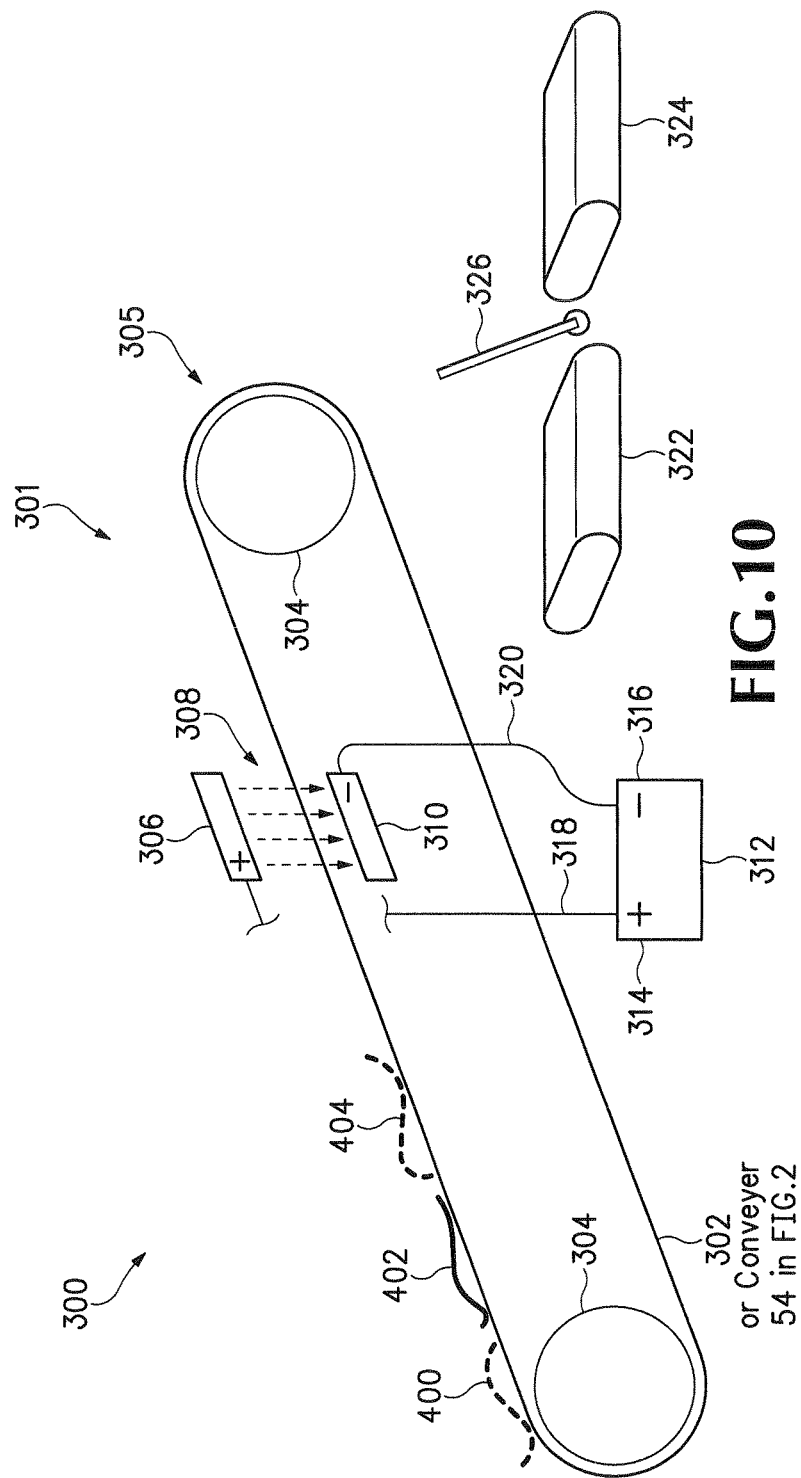

FIGS. 10-17 show in more detail how the electrostatic material separation system 300 operates. Referring to FIG. 10, the three pieces of waste material 400, 402, and 404 are moved onto the front end of the conveyor 301. The fiber waste material 402 is shown in a solid line while the plastic waste material 400 and 404 is shown in dashed lines. The fiber waste material 400 is again any type of paper, cardboard, office paper waste, flattened paper container, or other relatively thin or light material. The plastic film 400 and 404 can include plastic garbage bags, plastic containers, rubber, or any other type of relatively light or thin plastic or oil or resin based material.

Figure 11:
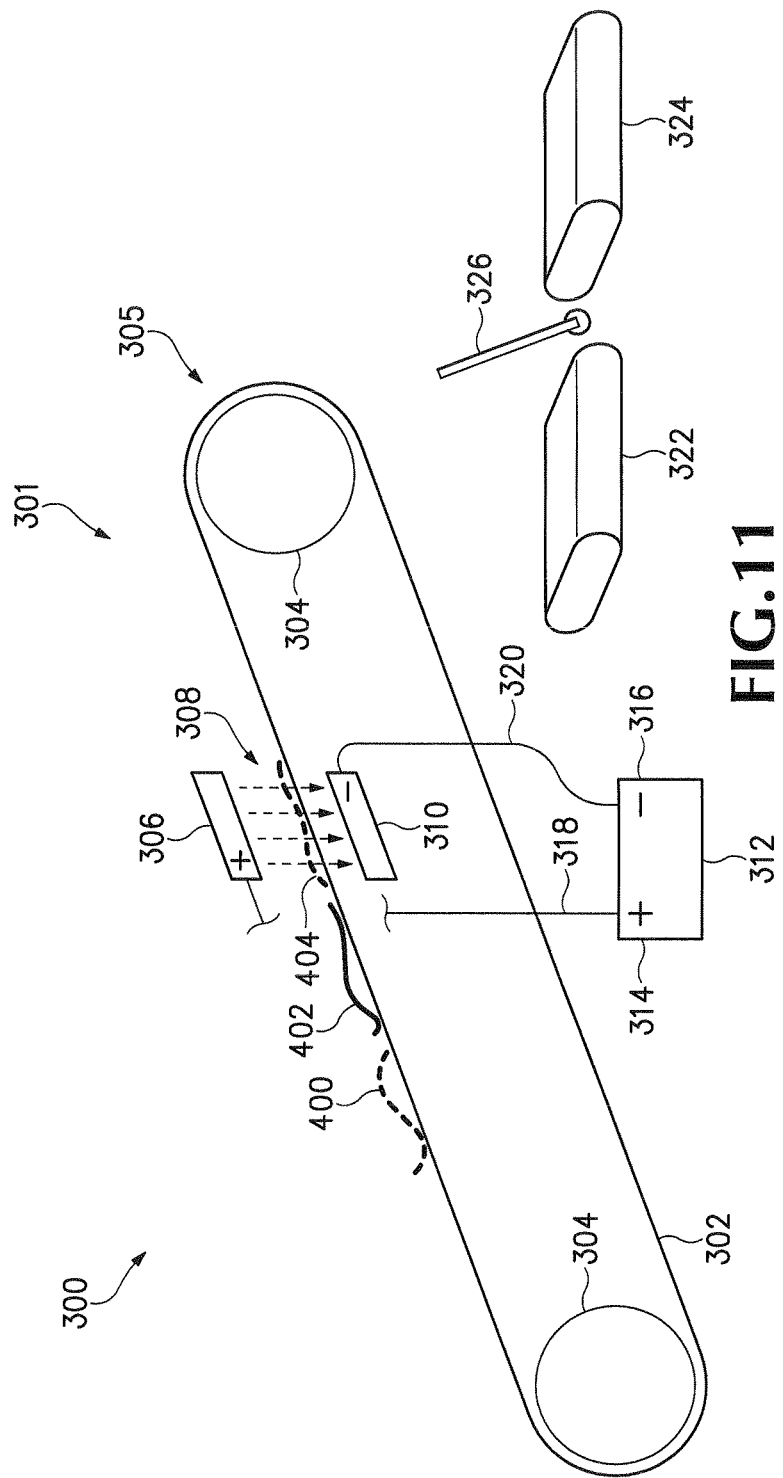

Referring to FIG. 11, the waste materials 400-404 are transported up the conveyor 301 and in-between the two electrostatic emitters 306 and 310 and the electrostatic ion charge 308. The first plastic waste material 404 is electrostatically charged by the emitters 306,310 causing the plastic 404 to electrostatically cling to the conveyor belt 302. Notice that the electrostatic cling due to electrostatic ion charge 308 causes the plastic film 404 to actually flatten out against the conveyor belt 302.

Figure 12:
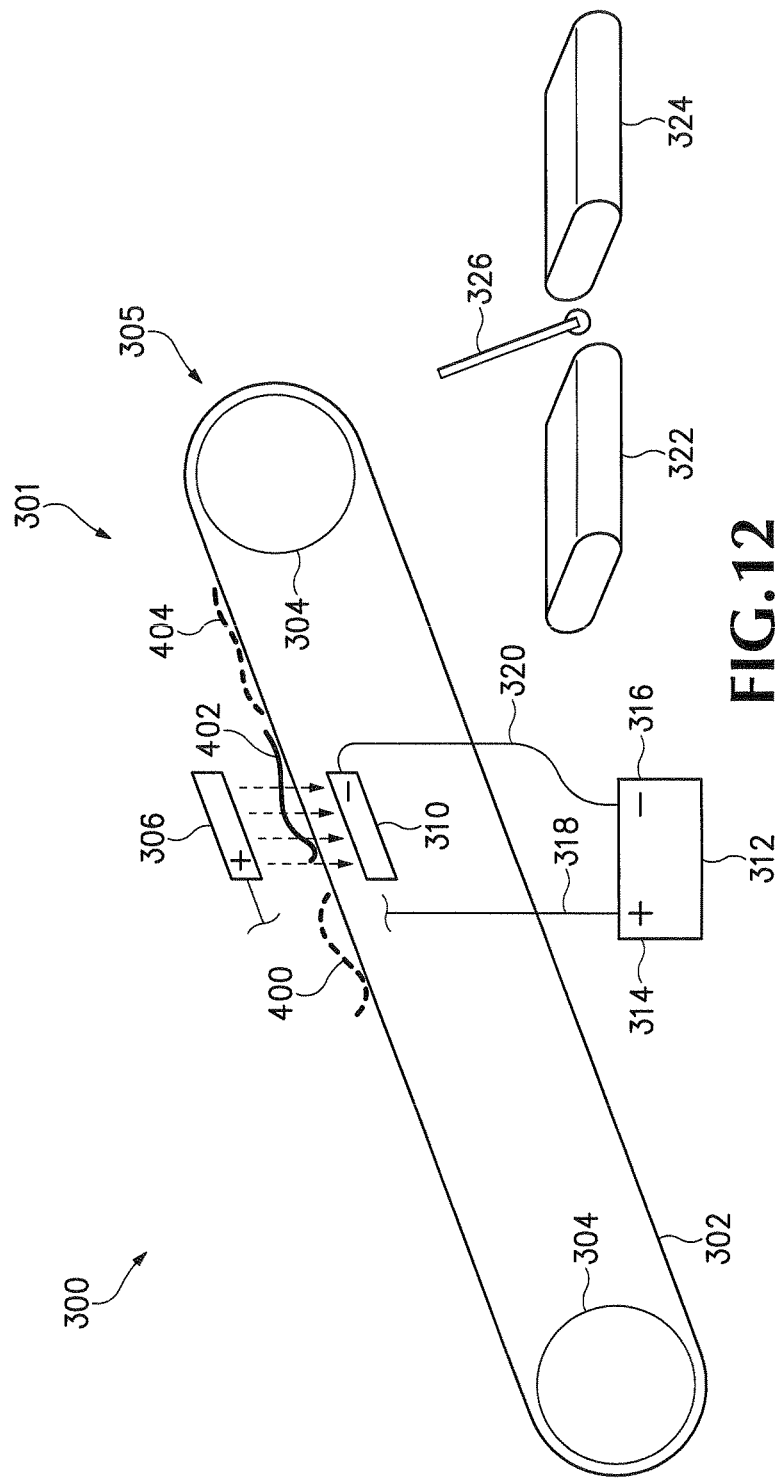

FIG. 12 shows a next point in time when the paper material 402 moves underneath the electrostatic emitters 306 and 310. The paper 402 may also become electrostatically charged but does not retain as much electrostatic charge or for as long as the plastic waste material 404. These different electrostatic charge retention characteristics are used in combination with the speed and angle of conveyor 301 to separate the fiber and plastic waste materials.

Figure 13:
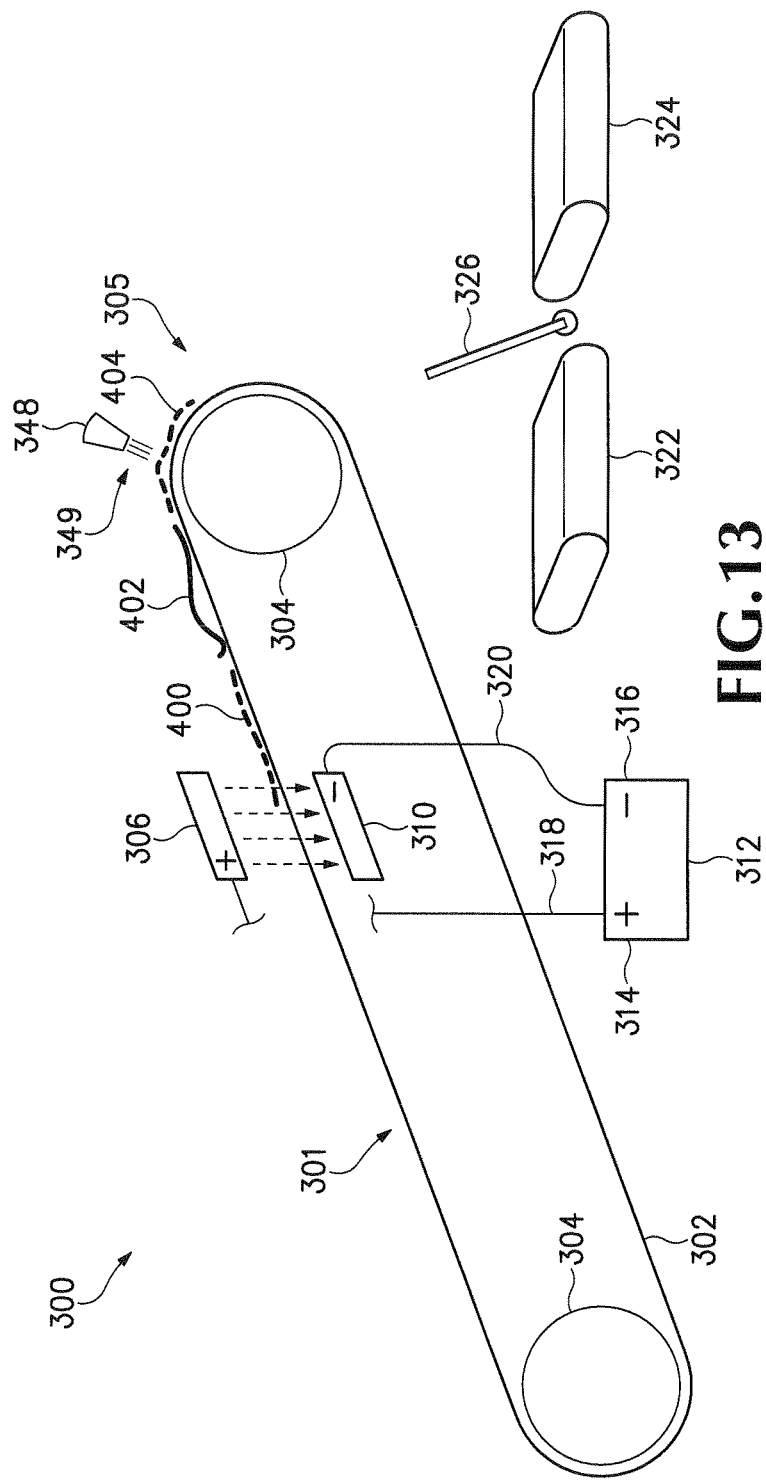

FIG. 13 shows another point in time when all of the waste materials 400-404 have been electrostatically charged by the electrostatic emitters 306 and 310. The first plastic film 404 is still firmly clinging to the conveyor belt 302. However, the paper 402 more quickly loses any electrostatic charge and begins to separate from conveyor belt 302.

Figure 14:
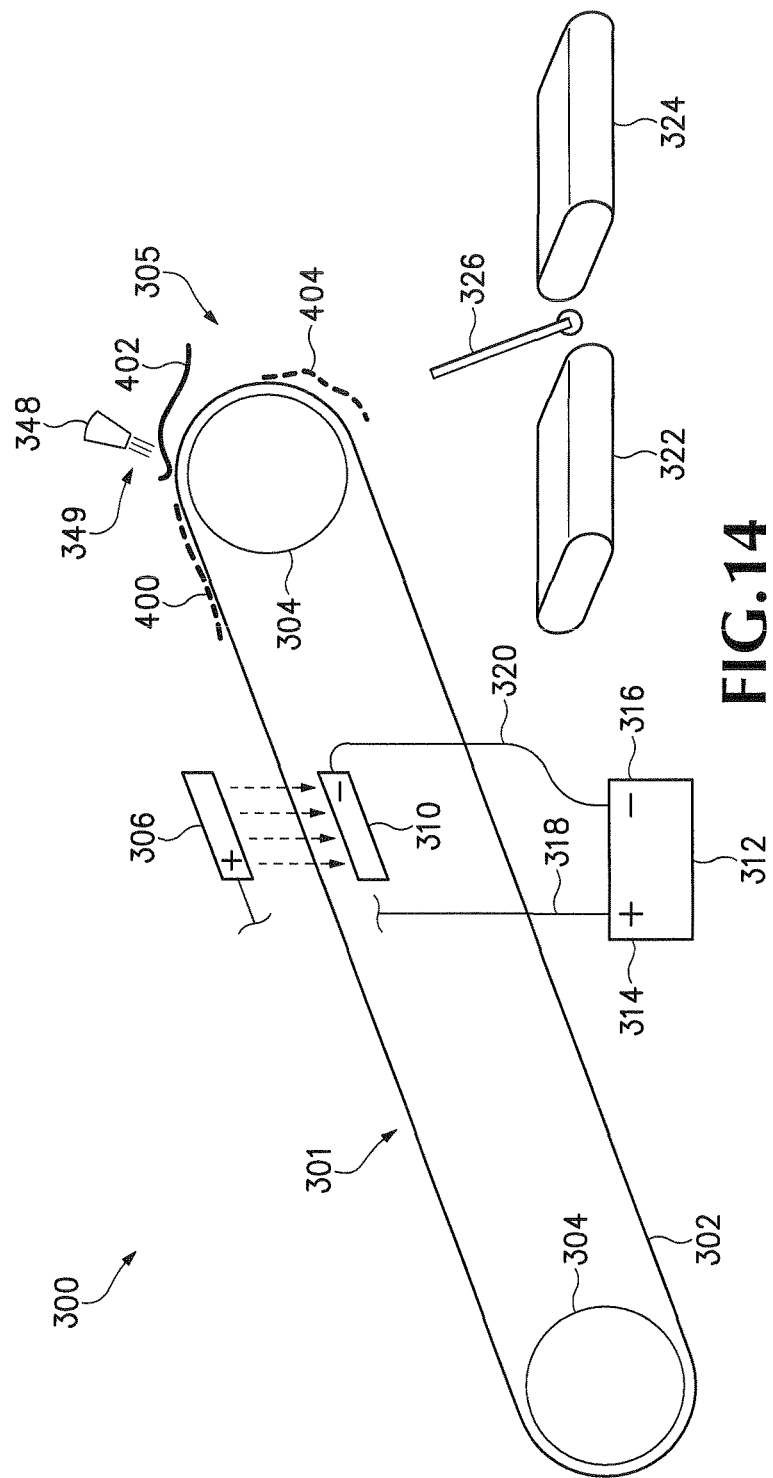

FIG. 14 shows a next point in time where the first plastic film 404 is still partially clinging to the conveyor belt 302 while being carried down and around the back end 305 of conveyor 301. Conversely, the paper 402 has lost a substantial amount of electrostatic charge and either no longer clings to the conveyor belt 302 or clings to the conveyor belt 301 with much less electrostatic force than the plastic 404. Accordingly, the paper 402 starts to separate and project out over the end 305 upon reaching the end of conveyor 301.

As previously described in FIG. 1, a second electrostatic emitter 348 may be used to apply a second loading of electrostatic charge to the waste material 400-404. The fiber material 402 approaching electrostatic emitter 348 has already lost most or all of the previous electrostatic charge applied by electrostatic emitter 306. Thus, the fiber material 402 in FIG. 14 already starts to separate from conveyor belt 302 prior to reaching the end of conveyor 301. This at least partial separation and launching of the fiber material 402 prevents the additional electrostatic charge 349 from emitters 348 from causing the fiber material to re-cling to the conveyor belt 302.

The plastic film 400 and 404 retains more electrostatic charge than the fiber material 402 and continues to cling to the conveyor belt 302 for a longer amount of time than fiber material 402. As a result, the plastic film 400 and 404 is still at least partially clinging to the conveyor belt 302 when arriving at electrostatic emitter 348. This allows the second electrostatic emitter 348 to provide additional electrostatic charge to the plastic material 400 and 404 that then allows the conveyor belt 302 to continue to cling to the plastic material 404. This additional electrostatic cling allows the conveyor belt 302 to further pull the plastic film down and around the end 305 of the conveyor 301.

Figure 15:
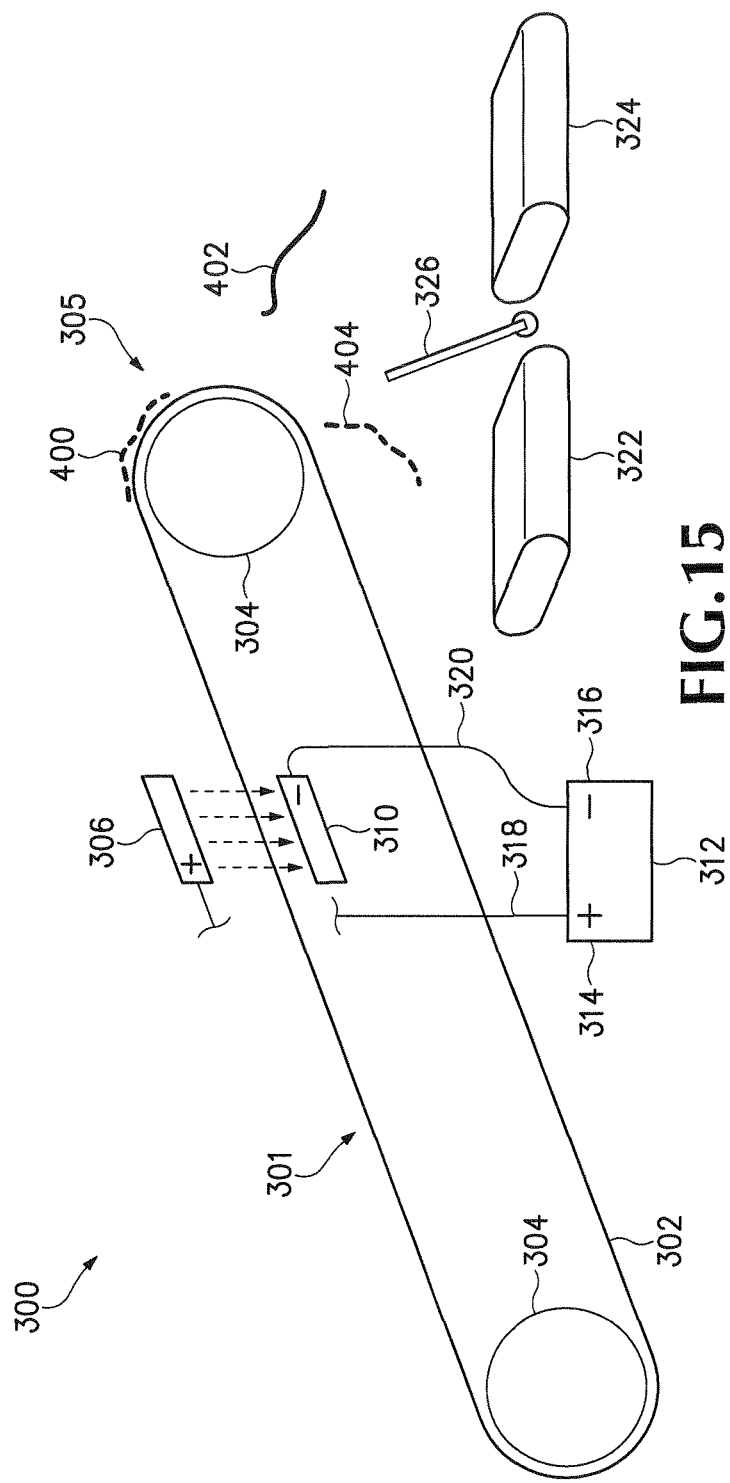
Figure 16:
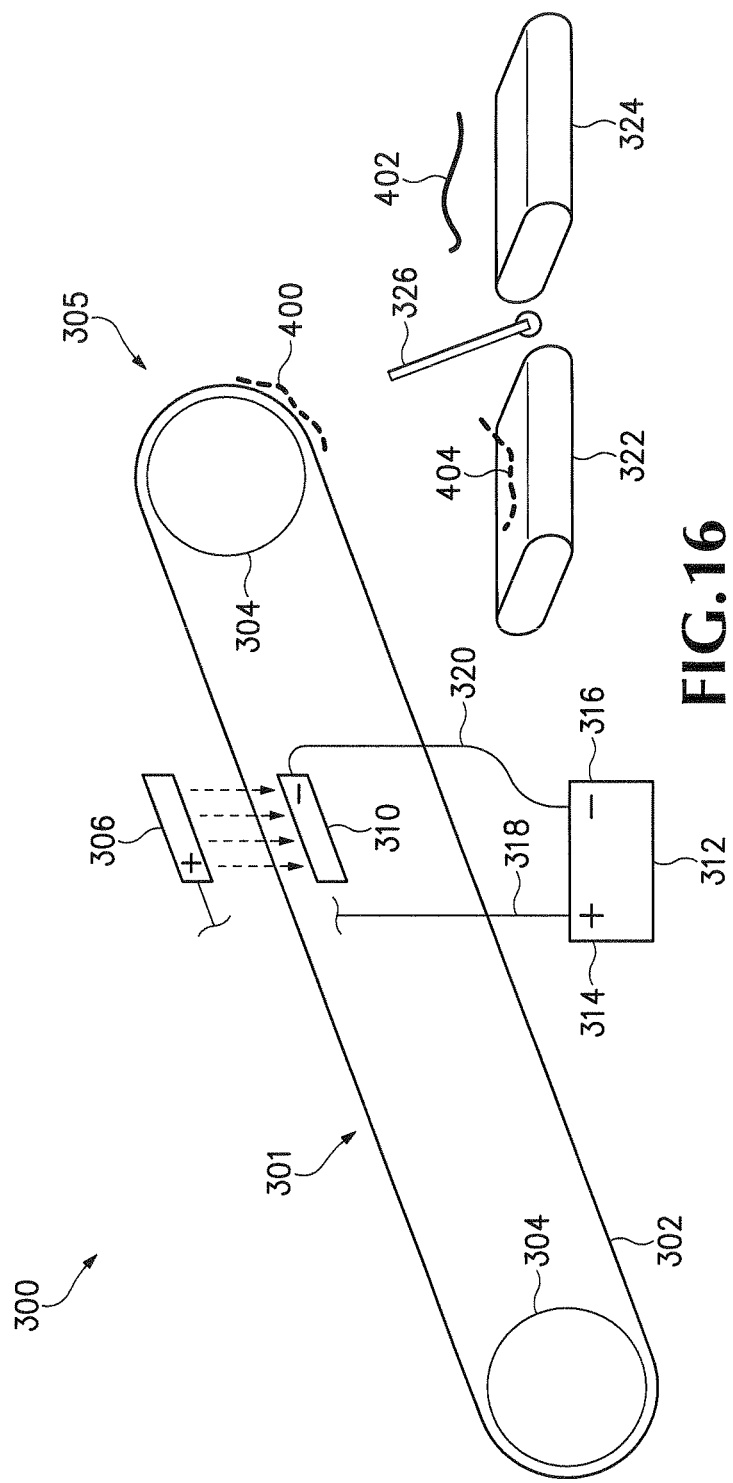

FIGS. 15-17 show the results of the different electrostatic charge characteristics of the paper 402 and plastic film 400 and 404. The plastic film 404 is carried down and possibly underneath the end 305 of conveyor 301 before detaching from conveyor belt 302. As a result, the plastic 404 drops relatively close to the end of the conveyor 301 onto the first conveyor 322.

Due to the speed of the conveyor 301 and the lack or reduced amount of electrostatic cling, the paper 402 is projected farther out from the back end 305 of conveyor 301. The separator arm 326 further directs the paper 402 onto the second conveyor 324 as the paper falls further away from conveyor 301 and towards the ground.

The second piece of plastic 400 shows similar electrostatic characteristics as plastic film 404. The plastic 400 continues to at least partially cling to the conveyor belt 302 as it is carried around the end 305 of conveyor 301. In FIGS. 16 and 17, centrificle force and continued electrostatic discharge finally allow the plastic 400 to release from conveyor belt 302. Similar to plastic film 404, the plastic film 400 drops below or closer to the end 305 of conveyor 301 than paper material 402. Accordingly, plastic film 400 drops down onto the conveyor 322 that already contains plastic film 404.

Thus, the electrostatic separation system 300 applies electrostatic charge to different waste materials that have different electrostatic charge retention characteristics. Applying the electrostatic charge causes a first category of waste materials to electrostatically cling more to the conveyor 301 than a second category of waste materials. As the waste materials are carried over an end of the conveyor 301, at least some of the first category of waste materials that electrostatically cling more to the conveyor belt 302 are pulled down closer to the end 305 of conveyor belt 302 into a first location. At least some of the second category of waste materials that electrostatically cling less to the conveyor belt 302 are projected out from the end 305 of the conveyor 301 to a second location further out from the first location.

Varying Parameters

Any variety of different conveyor parameters can be varied according to the type of materials that need to be separated. For example, more electrostatic charge can be applied by using more electrostatic transmitters as described above in FIG. 1. The amount of voltage applied by the electrostatic emitters can also be increased or decreased until an optimal amount of electrostatic cling is provided on the plastic materials.

The speed of conveyor belt 302 can also be either sped up or slowed down to maximize the separation characteristics between the plastic materials and the fiber materials. More electrostatic charge and more conveyor belt speed may increase separation. On the other hand, too much conveyor speed in relationship to electrostatic charge could cause some of the plastic materials to separate too early or be projected too far from the top of conveyor 301. In this case, the speed of the conveyor 301 may need to be reduced or the amount of electrostatic charge increased.

The correct amount of conveyor speed and electrostatic charge can be adjusted using trial and error or can be preconfigured based on previously obtained empirical data. In one example, a good separation of plastic film from fiber is provided when the conveyor belt 302 moves at around 550 feet per minute.

Other parameters can also be varied, such as the incline angle of conveyor 301. A high angle may cause the fiber materials 402 to project out further from the end 305 of conveyor 301 thus promoting better separation. On the other hand, a lesser conveyor incline angle may allow the plastic materials 400 and 404 to cling onto the conveyor belt 302 for a longer period of time while being pulled down and around back end 305. This may allow the plastic materials 400 and 404 to drop substantially closer to the end of conveyor 301 than fiber material 402. The incline angle of conveyor 301 can be adjusted by varying the height of the conveyor legs 332 and 334 as described above.

In other variations, the length of the conveyor 301 or the distance between the electrostatic emitters 306 and 310 and the end 305 of conveyor 301 may be adjusted so that the electrostatic cling of plastic materials 400 and 404 and the discharge of electrostatic charge from the fiber materials 402 maximize separation.

In the examples given above, the materials being separated are paper and plastic. However, it should be understood that the electrostatic separator system can be used for separating any materials that may have different electrostatic charge characteristics. The separator system can be used by itself or in combination with other separation screens, such as the air, disc, and bag breaker separation screens described above in FIGS. 1-8.

Having described and illustrated the principles of the invention in a preferred embodiment thereof, it should be apparent that the invention may be modified in arrangement and detail without departing from such principles. I/we claim all modifications and variation coming within the spirit and scope of the following claims.

The invention claimed is:

1. A material separation apparatus, comprising:
a conveyor including a conveyor belt configured to move both fiber paper materials and plastic materials up the conveyor, wherein the fiber paper materials and the plastic materials comprise substantially whole non-shredded pieces of material that are intermingled together on the conveyer belt;
a first electrostatic emitter configured to apply a first charge to both the fiber paper materials and the plastic materials while the fiber paper materials and plastic materials are moving on the conveyor belt, wherein an amount of the first charge applied to the plastic materials is greater than an electrostatic charge applied to the fiber paper materials and having a same polarity as the first charge;
a second electrostatic emitter configured to apply a second charge to the conveyor belt, wherein the second charge is opposite to the first charge and causes the fiber paper materials and the plastic materials to cling to the conveyor belt; and
a control device configured to control a speed of the conveyor, wherein the amount of the first charge causes at least some of the plastic materials transported on the conveyor to remain at least partially clinging to the conveyor belt while being carried over an end of the conveyor so that the plastic materials drop down relatively close to the conveyor in a first material stream, and wherein the fiber paper materials, having a smaller electrostatic charge than that of the plastic materials, cling less to the conveyor belt than the plastic materials and are launched substantially further out from the conveyor than the plastic materials, due to a combination of the speed of the conveyor and the smaller electrostatic charge, in a second material stream.

2. The material separation apparatus according to claim 1 wherein the first electrostatic emitter is located above and spaced apart from the conveyor belt and wherein the second electrostatic emitter is located below and spaced apart from the conveyor belt and aligned below the first electrostatic emitter.

3. The material separation apparatus according to claim 1 wherein the first electrostatic emitter is positioned above a middle portion of the conveyor belt, and wherein a third electrostatic emitter is located above a back end of the conveyer belt and is configured to apply more of the same first charge to the fiber paper materials and the plastic materials just before the fiber paper materials and the plastic materials are dropped off of the back end of the conveyor belt.

4. The material separation apparatus according to claim 1 comprising a first chute located below the end of the conveyor for receiving the first stream of plastic materials and a second chute located farther away from the back end of the conveyor for receiving the second stream of fiber paper materials.

5. The material separation apparatus according to claim 1 including a hold down drum located above the conveyor belt configured to press the fiber paper materials and the plastic materials down against a top side of the conveyor belt and flatten out the fiber paper materials and the plastic materials while being carried up the conveyor belt.

6. The material separation apparatus according to claim 5 including an air blower positioned in back of the bold down drum for blowing the fiber paper materials and the plastic materials off of the hold down drum.

7. The material separation apparatus according to claim 1 including a sprayer for spraying water on the fiber paper materials and the plastic materials to promote electrostatic cling of plastic materials to the conveyor.

8. The material separation apparatus according to claim 1 wherein the conveyor belt is made from a material that promotes electrostatic charged plastic material to cling to the conveyor belt.

9. The material separation apparatus according to claim 8 wherein the conveyor belt is rubber or fiber.

10. The material separation apparatus according to claim 1 wherein the fiber paper materials and the plastic materials comprise Municipal Solid Waste (MSW) moved at an upwardly inclined angle by the conveyor.

11. The material separation apparatus according to claim 10 wherein the first electrostatic emitter applies an electrostatic charge to the MSW as the MSW is being carried over the conveyor, the electrostatic charge causing at least some plastic MSW to electrostatically cling to the conveyor and drop relatively close to the end of the conveyor while paper MSW that electrostatically clings less to the conveyor drops farther out away from the end of the conveyor.

12. The material separation apparatus according to claim 10 including an air separator located in front of the conveyor configured to blow a first group of the MSW up through a chamber and onto a first MSW conveyor while a second group of the MSW drops down a chute onto a second MSW conveyor.

13. The material separation apparatus according to claim 12 wherein the air separator includes:
an opening configured to receive the MSW;
a drum configured to rotate; and
a blower configured to blow the first group of MSW up over the rotating drum and through an air chamber while the second group of MSW drops down the chute onto the second MSW conveyor in front of the air chamber.

14. The material separation apparatus according to claim 12 including a separation screen located between the air separator and the conveyor configured to receive the first group of MSW materials from the air separator and separate paper, cardboard and plastic from other containers in the MSW and send the separated paper, cardboard, and plastic to the conveyor.

15. A material separation system, comprising:
a conveyor including a conveyor belt configured to move non-shredded Municipal Solid Waste (MSW) that initially has substantially no electrostatic charge up the conveyor, wherein the MSW comprises non-shredded plastic materials and non-plastic materials;
a first electrostatic emitter positioned adjacent to the conveyor and configured to add an electrostatic charge to the MSW while the MSW is moving on the conveyor to cause at least some of the non-shredded plastic materials to electrostatically cling to the conveyor belt while being carried over an end of the conveyor so that the non-shredded plastic materials drop down close to the conveyor, wherein an amount of the electrostatic charge added by the first electrostatic emitter to the non-shredded plastic materials is greater than an amount of charge added to the non-plastic materials having a same polarity as the electrostatic charge;
a second electrostatic emitter configured to add an opposite electrostatic charge to the conveyor belt, wherein the opposite electrostatic charge added by the second electrostatic emitter is opposite in polarity to the electrostatic charge added by the first electrostatic emitter, and wherein the opposite electrostatic charge causes the non-shredded plastic materials and the non-plastic materials to cling to the conveyor belt; and
a control device configured to control a speed of the conveyor belt based, at least in part, on the amount of the electrostatic charge added by the first electrostatic transmitter, wherein at least some of the non-plastic materials in the MSW cling substantially less to the conveyor belt than the non-shredded plastic materials while being carried over the end of the conveyor so that the non-plastic materials launch out further from the end of the conveyor than the non-shredded plastic materials due to a combination of the speed of the conveyor belt and the amount of the electrostatic charge.

16. The material separation system according to claim 15 wherein the first electrostatic emitter is located above and spaced apart from a top side of the conveyor belt, and wherein the second electrostatic emitter is located below and spaced away from a bottom side of the conveyor belt.

17. The material separation system according to claim 15 wherein the first electrostatic emitter is located at a middle location of the conveyor belt and wherein a third electrostatic emitter is configured to provide the same electrostatic charge as the first electrostatic emitter onto the MSW at an upper end location of the conveyor belt.

18. The material separation system according to claim 15 including a hold down drum located above the conveyor configured to press the MSW down against a top side of the conveyor belt and flatten out the MSW to increase an electrostatic cling of the non-shredded plastic materials to the conveyor belt.

19. The material separation system according to claim 18 including an air blower positioned in back of the hold down drum configured to blow the MSW off of the hold down drum.

20. The material separation system according to claim 15 including a sprayer configured to spray water on the MSW to promote electrostatic cling of the non-shredded plastic materials to the conveyor belt.

21. An apparatus, comprising:
means for moving recyclable materials comprising plastic materials and non-plastic materials on a conveyor belt;
means for emitting an electrostatic charge to the recyclable materials while the recyclable materials are moving on the conveyor belt, wherein an amount of the electrostatic charge emitted from the means for emitting an electrostatic charge and applied to the plastic materials is greater than an amount of charge applied to the non-plastic materials having a same polarity as the electrostatic charge;
means for emitting an opposite electrostatic charge to the conveyor belt, wherein the opposite electrostatic charge emitted by the means for emitting an opposite electrostatic charge is opposite in polarity to the electrostatic charge emitted by the means for emitting an electrostatic charge, causing the recyclable materials to cling to the conveyor belt; and
means for controlling a speed of the conveyor belt based, at least in part, on the amount of the electrostatic charge emitted from the means for emitting, wherein a combination of the speed of the conveyor and the amount of the electrostatic charge causes at least some of the plastic materials to cling to the conveyor belt while being carried over an end of the conveyor belt so that the plastic materials drop down relatively close to the conveyor belt in a first material stream, and wherein the non-plastic materials, having a smaller amount of the electrostatic charge than that of the plastic materials, cling less to the conveyor belt than the plastic materials and are launched substantially further out from the conveyor belt than the plastic materials, due to a combination of the speed of the conveyor belt and the smaller amount of the electrostatic charge, in a second material stream.

22. The apparatus according to claim 21 including means for pressing the recyclable materials down against a top side of the conveyor belt and to flatten out the recyclable materials to increase an electrostatic cling of the plastic materials to the conveyor belt, wherein the means for pressing is located above the conveyor belt.

23. The apparatus according to claim 22 including means for blowing the recyclable materials off of the means for pressing, wherein the means for blowing is located in back of the means for pressing.

24. The apparatus according to claim 21 including means for spraying water on the recyclable materials to promote electrostatic cling of the plastic materials to the conveyor belt.

* * * * *

UNITED STATES PATENT AND TRADEMARK OFFICE
CERTIFICATE OF CORRECTION

| | | |
|---|---|---|
| PATENT NO. | : 8,618,432 B2 | Page 1 of 1 |
| APPLICATION NO. | : 11/959361 | |
| DATED | : December 31, 2013 | |
| INVENTOR(S) | : Miller et al. | |

It is certified that error appears in the above-identified patent and that said Letters Patent is hereby corrected as shown below:

In the Claims:

Column 12, line 40, in claim 6, delete "bold" and insert --hold--, therefor.

Signed and Sealed this
Twelfth Day of August, 2014

Michelle K. Lee
*Deputy Director of the United States Patent and Trademark Office*